US012055960B2

(12) United States Patent
Fang et al.

(10) Patent No.: US 12,055,960 B2
(45) Date of Patent: Aug. 6, 2024

(54) SPLIT VALVES FOR REGULATING FLUID FLOW IN CLOSED LOOP SYSTEMS

(71) Applicant: General Electric Company, Schenectady, NY (US)

(72) Inventors: Biao Fang, Niskayuna, NY (US); David Justin Brady, Lynn, MA (US); John C. Glessner, Evendale, OH (US); Brandon W. Miller, Evendale, OH (US); Stephanie Glynn Cotten, Evendale, OH (US); William Dwight Gerstler, Niskayuna, NY (US); Daniel A. Niergarth, Evendale, OH (US); Michael Joseph Murray, West Chester, OH (US)

(73) Assignee: GENERAL ELECTRIC COMPANY, Cincinnati, OH (US)

( * ) Notice: Subject to any disclaimer, the term of this patent is extended or adjusted under 35 U.S.C. 154(b) by 0 days.

(21) Appl. No.: 17/702,563

(22) Filed: Mar. 23, 2022

(65) Prior Publication Data

US 2023/0305584 A1    Sep. 28, 2023

(51) Int. Cl.
*G05D 7/06* (2006.01)
*F16K 11/065* (2006.01)
(Continued)

(52) U.S. Cl.
CPC ........ *G05D 7/0635* (2013.01); *F16K 11/0712* (2013.01); *F16K 31/406* (2013.01);
(Continued)

(58) Field of Classification Search
CPC ..... Y10T 137/86879; Y10T 137/86887; Y10T 137/86895; Y10T 137/86549;
(Continued)

(56) References Cited

U.S. PATENT DOCUMENTS 1,983,106 A * 12/1934 Sundstrom .............. F16K 41/12
74/18.2
2,691,773 A * 10/1954 Lichtenberger ......... F16K 41/10
137/557
(Continued)

FOREIGN PATENT DOCUMENTS

| CN | 104481697 A | 4/2015 |
| DE | 4201442 A1 | 1/1995 |
| FR | 2492129 A1 | 4/1982 |

OTHER PUBLICATIONS

European Patent Office, "European Search Report," issued in connection with European Application No. 23163502.0, Jul. 14, 2023, 13 pages.

*Primary Examiner* — William M McCalister
(74) *Attorney, Agent, or Firm* — HANLEY, FLIGHT & ZIMMERMAN, LLC

(57) ABSTRACT

Example split valves for regulating a first flowrate and a second flowrate of a fluid within a closed loop systems are disclosed herein. An example split valve includes an electrohydraulic servo valve coupled to a first piston via a first hydraulic flowline and a second hydraulic flowline, the first piston to include a piston shaft, a first head, and a second head; one or more bellows fixed to at least one of the first head or the second head, the one or more bellows to hermetically seal the fluid from a hydraulic fluid; and a control system connected to the electrohydraulic servo valve, the control system to adjust the first flowrate and the second flowrate of the fluid through a first fluid chamber, the first piston to be located in the first fluid chamber.

15 Claims, 9 Drawing Sheets

(51) Int. Cl.
*F16K 11/07* (2006.01)
*F16K 31/40* (2006.01)
*G05D 7/00* (2006.01)
*G05D 11/00* (2006.01)

(52) U.S. Cl.
CPC ........... *G05D 7/005* (2013.01); *G05D 11/003* (2013.01); *F16K 11/065* (2013.01); *Y10T 137/86598* (2015.04)

(58) Field of Classification Search
CPC ....... Y10T 137/86582; Y10T 137/8659; Y10T 137/86598; Y10T 137/86606; Y10T 137/86614; Y10T 137/86574; Y10T 137/8667; Y10T 137/86678; Y10T 137/86686; Y10T 137/86694; Y10T 137/8671; F16K 11/0712; F16K 31/406; F16K 11/065; G05D 7/0635; G05D 7/005; G05D 11/003
USPC ... 137/625.48, 625.49, 625.5, 625.17, 625.6, 137/625.61, 625.62, 625.63, 625.64, 137/625.2, 625.25, 625.26, 625.27, 137/625.67, 625.69
See application file for complete search history.

(56) References Cited

U.S. PATENT DOCUMENTS

| | | | | |
|---|---|---|---|---|
| 2,693,822 | A * | 11/1954 | Gerow | F16K 41/10 137/315.07 |
| 2,909,195 | A * | 10/1959 | Keyt | F15B 13/16 137/625.63 |
| 3,152,612 | A * | 10/1964 | Avery | F16K 31/006 91/363 R |
| 3,608,587 | A * | 9/1971 | Zbell | F15B 13/0405 251/84 |
| 4,061,155 | A * | 12/1977 | Sopha | F15B 13/0436 137/487 |
| 4,114,650 | A * | 9/1978 | Gordon | F15B 13/0402 91/52 |
| 4,452,267 | A * | 6/1984 | Ott | G05D 16/2026 137/116.5 |
| 4,644,969 | A * | 2/1987 | Watanabe | F16K 31/1221 137/625.5 |
| 4,775,195 | A * | 10/1988 | Miller | B64C 25/42 137/487 |
| 5,148,735 | A * | 9/1992 | Veletovac | H02N 2/0075 91/461 |
| 5,240,041 | A * | 8/1993 | Garnjost | F15B 13/0438 137/625.62 |
| 5,558,506 | A * | 9/1996 | Simmons | F01L 25/066 417/393 |
| 5,709,245 | A * | 1/1998 | Miller | F15B 13/0438 137/625.62 |
| 5,806,565 | A * | 9/1998 | Kadlicko | F15B 13/0438 137/625.63 |
| 6,718,759 | B1 * | 4/2004 | Tabor | F15B 11/02 60/368 |
| 6,732,512 | B2 * | 5/2004 | Pfaff | E02F 9/2025 60/459 |
| 7,779,853 | B2 * | 8/2010 | Reilly | G05D 16/2024 137/625.61 |
| 8,887,503 | B2 | 11/2014 | Sonwane et al. | |
| 9,067,785 | B2 | 6/2015 | Eng et al. | |
| 9,341,084 | B2 | 5/2016 | Xie et al. | |
| 9,752,460 | B2 | 9/2017 | Bowan | |
| 9,828,882 | B2 | 11/2017 | Numata et al. | |
| 10,927,866 | B2 * | 2/2021 | Rannow | F15B 13/086 |
| 11,098,811 | B2 * | 8/2021 | Meshaikhis | F16K 37/0083 |
| 11,608,840 | B2 * | 3/2023 | Yuan | F16K 11/0712 |
| 2004/0099320 | A1 * | 5/2004 | Oniduka | F16K 11/07 137/625.66 |
| 2007/0045579 | A1 * | 3/2007 | Wirtl | G05D 16/163 251/129.04 |
| 2010/0282991 | A1 * | 11/2010 | Okamoto | F16K 31/0655 251/129.15 |
| 2016/0299512 | A1 * | 10/2016 | Summers | G05B 15/02 |
| 2017/0370481 | A1 | 12/2017 | Glazewski | |
| 2018/0100594 | A1 * | 4/2018 | Roseman | F16K 11/022 |
| 2019/0040965 | A1 | 2/2019 | Tanikawa et al. | |
| 2021/0102492 | A1 | 4/2021 | Rambo et al. | |
| 2021/0108735 | A1 * | 4/2021 | Bujewicz | F15B 13/0433 |

* cited by examiner

SPLIT VALVES FOR REGULATING FLUID FLOW IN CLOSED LOOP SYSTEMS

FIELD OF THE DISCLOSURE

This disclosure relates generally to splitting a flow path of a fluid, and, more particularly, to split valves for regulating fluid flow in closed loop systems.

BACKGROUND

Thermal management systems in vehicles (e.g., aircraft) can use a fluid (e.g., a heat exchange fluid such as super critical carbon dioxide (sCO2)) for exchanging thermal energy between different components of an engine (e.g., a turbofan engine) and/or other systems in the vehicle. Some thermal management systems can include heat source heat exchangers to transfer heat from vehicle systems/components to the fluid and/or heat sink heat exchangers to transfer heat from the fluid to vehicle systems/components. Thermal management systems that include sCO2 flowing through a thermal transport bus typically keep the sCO2 above a minimum temperature (e.g., 305 Kelvin (K), etc.) and a minimum pressure (e.g., 1150 pound-force per square inch (psi), etc.) to maintain the supercritical fluid state of the carbon dioxide or to keep the thermal efficiency of the fluid consistent. The fluid may be selectively bypassed around one or more of the heat source heat exchangers and/or the heat sink heat exchangers in the thermal management system to effectively control an increase and/or decrease of the temperature and pressure of the fluid. To regulate the flow paths of the fluid, split valves are used in series or in parallel within the thermal management system to control how much of the fluid flow is introduced to or secluded from the various heat exchangers.

BRIEF DESCRIPTION OF THE DRAWINGS

A full and enabling disclosure of the preferred embodiments, including the best mode thereof, directed to one of ordinary skill in the art, is set forth in the specification, which makes reference to the appended Figures, in which.

Figure 1:
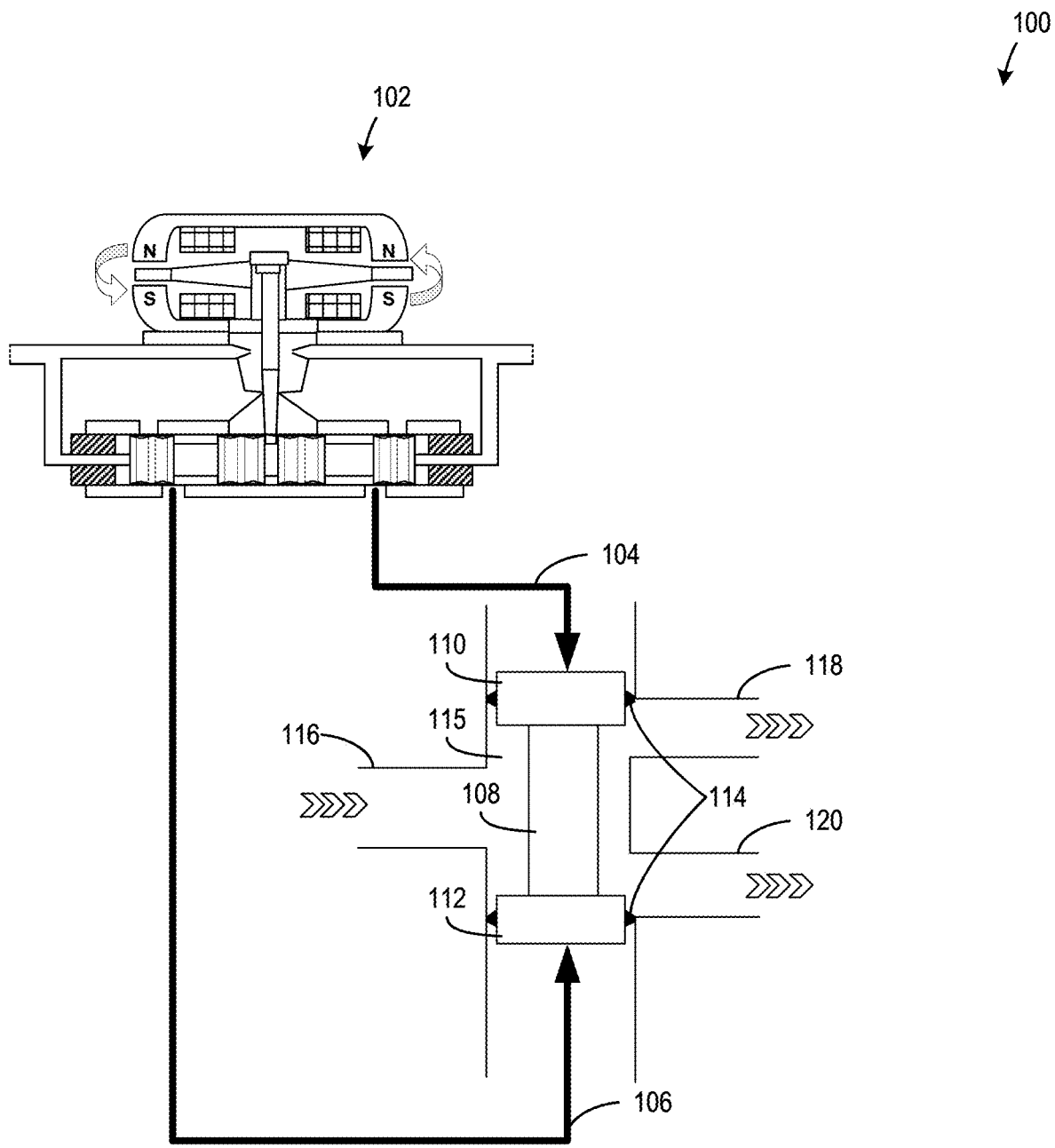
FIG. 1 illustrates a known split valve for regulating fluid flowing through a thermal transport bus.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Connection references (e.g., attached, coupled, connected, joined, detached, decoupled, disconnected, separated, etc.) are to be construed broadly and may include intermediate members between a collection of elements and relative movement between elements unless otherwise indicated. As used herein, the term "decouplable" refers to the capability of two parts to be attached, connected, and/or otherwise joined and then be detached, disconnected, and/or otherwise non-destructively separated from each other (e.g., by removing one or more fasteners, removing a connecting part, etc.). As such, connection/disconnection references do not necessarily infer that two elements are directly connected and in fixed relation to each other. Stating that any part is in "contact" with another part means that there is no intermediate part between the two parts.

Descriptors "first," "second," "third," etc., are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

In some vehicles (e.g., aircraft, rockets, etc.), engines (e.g., turbofans, turbojets, hydrogen engines, etc.) output heat during operation that can be recovered to warm other parts of the vehicle. The heat can be transferred to a fluid (e.g. a heat exchange fluid such as super critical carbon dioxide (sCO2) in a closed loop system (e.g., a thermal management system (TMS), waste heat recovery system, etc.) to further cool the hot portions of the engines and/or to warm other components of the vehicle. The closed loop systems may contain a main pump to pressurize and increase the kinetic energy of the fluid. The closed loop systems may also include a split valve downstream of the main pump to regulate flow of the fluid into a first flowline and a second flowline. The first flowline may lead to a compressor discharge (CDP) heat exchanger, and the second flowline may lead to a waste heat recovery system (WHP). The WHP flowline leads to portion(s) of the engine (e.g., fuel line(s), compressor(s), combustor(s), etc.) that are to be cooled or warmed via the fluid.

The operations of some split valves for regulating the fluid use an electrohydraulic servo valve (EHSV) to drive (e.g., actuate, move, slide, etc.) a piston in the split valve. The piston is housed in a fluid chamber of the split valve that includes an inlet flowline, a first outlet flowline, and a second outlet flowline through which the fluid is transported. The EHSV pressurizes two streams of a hydraulic fluid (e.g., fuel, oil, water, etc.), and a pressure differential between the two streams drives (e.g., actuates, moves, slides, etc.) the piston. Since the EHSV uses the hydraulic fluid to actuate the piston, there is a risk of contaminating the example sCO2 with the hydraulic fluid, and vice versa. If contamination were to occur, the example sCO2 may lose some thermal efficiency causing the example TMS to operate less effectively than the theoretical and/or practical potential. Similarly, if a leak were to occur, the pressure and/or temperature of the example sCO2 may decrease below the supercritical ranges, thus causing the example sCO2 to phase shift from a supercritical fluid to a gas or a liquid. Such a phase shift would also cause the example TMS to operate ineffectively. Examples disclosed herein include split valves for regulating fluid (e.g., sCO2, etc.) in closed loop systems (e.g., thermal management systems). In the examples disclosed herein, the split valves include hermetic seal(s) (e.g., bellows) that prevent blending of the fluid (e.g., sCO2, etc.) with the hydraulic fluid and/or the external atmosphere.

In example split valves disclosed herein, a legacy control system is used with the fuel-driven EHSV to reposition the piston based on pressures within the closed-loop system and/or temperatures of the example sCO2. A linear variable differential transformer (LVDT) measures the position of the piston and feeds back positional information to the control system. In some example split valves disclosed herein, a bellows is used to hermetically seal the split valve and inhibit (e.g., prevent, limit, block, etc.) the hydraulic fluid from blending with the example sCO2. In some example split valves disclosed herein, an interstage drain is included in a fluid chamber to further inhibit the hydraulic fluid from mixing with the example sCO2. In some example split valves disclosed herein, two bellows are used to seal the example sCO2 to account for high pressures (e.g., 3000 psi) of the example sCO2 within the split valve. In some example split valves disclosed herein, two or more bellows and one or more intermediate fluid chambers with pressurized inert gas(es) is/are included between the example sCO2 and atmosphere to account for high pressures (e.g., 3000 psi) of the example sCO2. In some example split valves disclosed herein, the sCO2 also acts as the hydraulic fluid to actuate the piston and lower fluid pressures are maintained to contain the fluid in the example split valve without exposure to atmosphere.

The terms "upstream" and "downstream" refer to the relative direction with respect to fluid flow in a fluid pathway. For example, "upstream" refers to the direction from which the fluid flows, and "downstream" refers to the direction to which the fluid flows. The terms "primary" and "auxiliary" refer to the endpoints of the respective flowlines. For example, "primary" refers to the flowline that directs sub-cooled cryogenic fuel to the onboard cryogenic fuel tank(s), and "auxiliary" refers to the flowline that directs unused cryogenic fuel to a storage tank. The term "saturated pressure" refers to the pressure at which a given cryogenic liquid and its vapor can co-exist in thermodynamic equilibrium within a confined container.

In some examples used herein, "including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

For the figures disclosed herein, the electrohydraulic servo valves (EHSVs) can be single-stage servo valves or two-stage servo valves that use a flapper or deflector to strengthen and/or weaken pressures of a hydraulic fluid (e.g., fuel, mineral oil, water etc.) that a main fuel system supplies to the EHSV via one or more hydraulic pumps. A controlled electrical current is provided to electromagnets which cause the flapper to close off one flowline of the hydraulic fluid and to open up the other flowline of the hydraulic fluid. The opening and closing of the hydraulic fluid flow into the EHSV increases and decreases the pressure in either side of a spool in the EHSV. In some examples, when the spool moves, the spool obstructs (partially or fully) a first fluid flowline outlet and clears (partially or fully) a second fluid flowline outlet such that the hydraulic pressure in the first fluid flowline increases and the hydraulic pressure in the second fluid flowline decreases. The first fluid flowline supplies hydraulic fluid to one end of the piston and/or an actuator plate, and the second fluid flowline supplies hydraulic fluid to another end of the piston and/or the actuator plate in the split valve. Thus, the hydraulic pressure outputs from the EHSV can precisely actuate the piston and control the flowrate outputs of the split valve. In summation, the altering of the electric current changes the position of the flapper, which changes the position of the spool based on the variable pressures, which changes the pressures of the hydraulic fluid in the outlet flowlines, which causes the piston in the split valve to actuate and control the flow of the supercritical fluid through the split valve.

For the figures disclosed herein, identical numerals indicate the same elements throughout the figures. The example illustration of FIG. 1 is an example schematic of a known split valve 100 for regulating flow of a fluid through a pump system (e.g., a thermal management system). As shown in FIG. 1, the split valve 100 includes an EHSV 102 with a first hydraulic flowline 104, and a second hydraulic flowline 106 both leading to either ends of a piston. The split valve 100 further includes a piston shaft 108, a first head 110, a second head 112, and O-rings 114 that form the piston. The split valve 100 further includes a fluid chamber 115 with an inlet flowline 116, a first outlet flowline 118, and a second outlet flowline 120.

The illustrated split valve 100 of FIG. 1 includes the EHSV 102 which actuates the piston via pressure outputs from the first hydraulic flowline 104 and the second hydraulic flowline 106. For example, if the flowrate through the first outlet flowline 118 is too high, then a sensor in the fluid system sends a signal to the EHSV 102 to increase a pressure output of the first hydraulic flowline 104, thereby decreasing a pressure output of the second hydraulic flowline 106. This change in pressure outputs causes the piston to move in a direction that restricts flow of the fluid through the first outlet flowline 118 and enables flow of the fluid through the second outlet flowline 120.

The split valve 100 of FIG. 1 includes the O-rings 114 fixed to the first head 110 and the second head 112 to seal the fluid chamber 115 from the hydraulic fluid. The O-rings 114 prevent the hydraulic fluid from contaminating the fluid flowing through the split valve 100 and vice versa. However, in examples where a split valve is used in an example thermal management system (TMS) that uses supercritical fluid (e.g., sCO2) as the heat exchange fluid, the split valve 100 would not be sufficient to prevent contamination. To keep carbon dioxide in the supercritical state, the pressure and temperature of sCO2 (and in turn, the TMS) should be above 1070 psi and 305 K, respectively. In examples where the thermal management system uses sCO2, the fluid chamber 115 in the split valve could have pressures greater than 1150 psi and temperatures greater than 305 K. At those temperatures and pressures, the O-rings 114 would not be sufficient to seal the sCO2 from the hydraulic fluid causing pressure drops in the TMS, contamination of the hydraulic fluid, and/or contamination of the sCO2.

Examples disclosed herein solve these problems, such as insufficient seal, etc. with split valves that use one or more bellows to hermetically seal a fluid (e.g., sCO2, etc.) from an EHSV hydraulic fluid or from other driving mechanisms of the split valve such that the fluid pressures in the TMS remain charged and uncontaminated. Some examples are also disclosed herein that solve these problems, such as insufficient seal, etc., with split valve(s) that use the fluid (e.g., sCO2, etc.) as the hydraulic fluid to actuate a piston in the split valve. The example bellows referred to herein may be metallic bellows composed of alloys or other materials including titanium, stainless steel, etc. and may be manufactured via laser welding, hydroforming, electroforming, etc.

Figure 2:
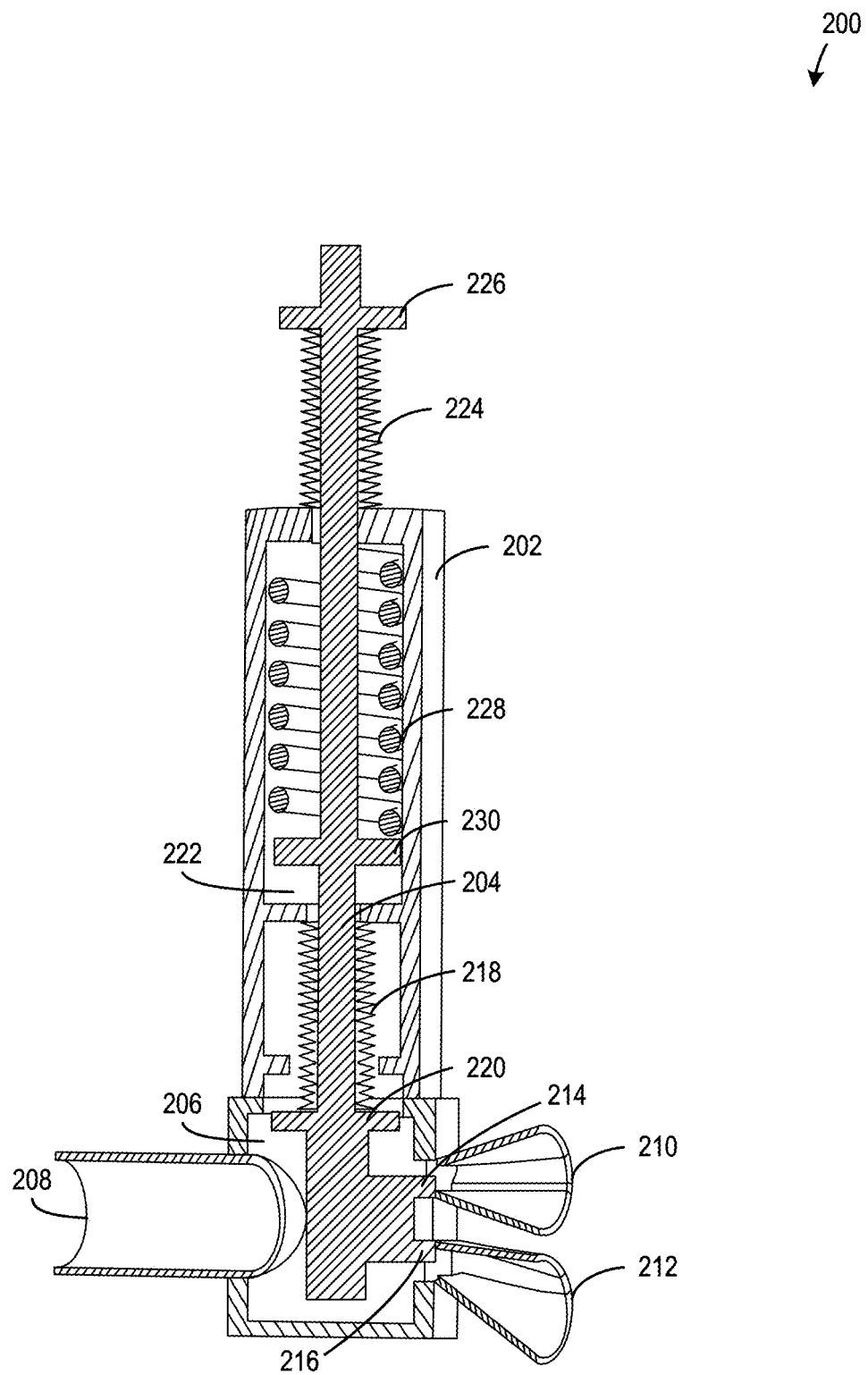
FIG. 2 illustrates a first example split valve with bellows and cascading pressure chambers for regulating fluid flowing through a thermal transport bus.

FIG. 2 illustrates a split valve 200 for regulating the flow of a fluid in a closed loop system. In some examples, the fluid is a supercritical fluid, and the closed loop system is a thermal management system. In some examples, the supercritical fluid is sCO2. The split valve 200 illustrated in FIG. 2 includes a body 202, a piston 204, a first fluid chamber 206, an inlet port 208, a first outlet adapter port 210, a second outlet adapter port 212, a first head 214, a second head 216, a first bellows 218, a first seat 220, a second fluid chamber 222, a second bellows 224, a second seat 226, a spring 228, and a third seat 230. A driving mechanism for the piston 204 in the split valve 200 is not illustrated in FIG. 2. However, in some examples, the mechanism for actuating the piston 204 can be an EHSV, an electric motor, or another mechanism that provides mechanical actuation in response to an electrical signal input.

In some examples, the fluid (e.g., sCO2, etc.) is pressurized to significantly high pressures (e.g., 3000 psi, etc.) in the TMS, the thermal transport bus, and in the first fluid chamber 206. Therefore, in the illustrated example of FIG. 2, the first bellows 218 is attached (e.g., welded, otherwise bonded, etc.) to the body 202 and the first seat 220 to hermetically seal the fluid in the first fluid chamber 206 and inhibit, prevent, and/or otherwise reduce leakage into the second fluid chamber 222 during the lifespan (e.g., usable life) of the split valve 200. In the illustrated example of FIG. 2, the split valve 200 includes the second fluid chamber 222 as a buffer between the first fluid chamber 206 and external, ambient, and/or atmospheric pressures. The example second fluid chamber 222 is pressurized with an inert gas (e.g., nitrogen, helium, argon, etc.) that is non-reactive, non-flammable, and can be pressurized prior to operation of the split valve 200. The inclusion of the second fluid chamber 222 provides a cascading effect in the split valve 200. The cascading effect reduces the pressure differential between the first fluid chamber 206 and the adjacent pressure that the first bellows 218 is sealing. The example second fluid chamber 222 is pressurized to a pressure between the first fluid chamber 206 pressure and an ambient and/or atmospheric pressure. For example, the first fluid chamber 206 may be pressurized to 3000 psi, the second fluid chamber 222 may be pressurized to 1500 psi, and ambient and/or atmospheric pressure may be 14.7 psi. The example second fluid chamber 222 mitigates the drop in pressure from the first fluid chamber 206 to atmospheric pressure and significantly reduces stress(es) acting on the first bellows 218. The reduced stress(es) significantly increase the fatigue capability of the example first bellows 218, and the reduced pressure differential significantly increases the cyclic durability of the first bellows 218 and/or the split valve 200. If the example second fluid chamber 222 was not included in the split valve 200, then the first fluid chamber 206 and the first bellows 218 would be adjacent to atmospheric pressure, there would be greater stress(es) acting on the first bellows 218 due to the larger pressure differential, and the split valve 200 and/or the first bellows 218 would have a shorter lifespan. Although the illustrated example of FIG. 2 includes the first fluid chamber 206 and the second fluid chamber 222, the example split valve 200 can include more fluid chambers to provide a more gradual cascading effect to further increase the lifespan (e.g., usable life) of the split valve 200, the first bellows 218, and/or the second bellows 224.

In the illustrated example of FIG. 2, the example split valve 200 includes the first fluid chamber 206 into which the fluid flows via the inlet port 208 and flows out of via the first outlet adapter port 210 and/or the second outlet adapter port 212. The first outlet adapter port 210 connects the first fluid chamber 206 to a first flowline with a first diameter, and the second outlet adapter port 212 connects the first fluid chamber 206 to a second flowline with a second diameter. The first outlet adapter port 210 and the second outlet adapter port 212 are used to connect the first flowline and the second flowline to the first fluid chamber 206 to reduce the stroke length of the piston 204 relative to what the stroke length would be if the first flowline and the second flowline were directly connected to the first fluid chamber 206 without outlet adapter ports.

In the illustrated example of FIG. 2, the first outlet adapter port 210 has a first entrance and a first exit, and the second outlet adapter port 212 has a second entrance and a second exit. The example first entrance and second entrance are rectangularly shaped with heights that are less than the diameters of the first flowline and the second flowline. The heights of the first entrance and the second entrance are also the same and/or similar (e.g., +/−1 millimeter (mm)) thickness as the first head 214 and the second head 216. Therefore, when the first head 214 is fully restricting flow through the first outlet adapter port 210, the second head 216 is fully allowing flow through the second outlet adapter port 212, and vice versa. The first entrance and second entrance also have widths that are greater than the diameters of the first flow line and the second flowline. In some examples, the widths and heights of the of the first entrance and the second entrance are designed such that effective areas of the first entrance and the second entrance are the same as effective areas of the first exit and the second exit as well as effective areas of the first flowline and the second flowline. Therefore, the geometry of the first outlet adapter port 210 and the second outlet adapter port 212 connecting the first fluid chamber 206 to the first flowline and the second flowline reduces the stroke length of the piston 204 (relative to the flowlines being directly connected to the first fluid chamber 206) without restricting flow through the flowlines.

In the illustrated example of FIG. 2, the first bellows 218 is attached (e.g., welded, otherwise bonded, etc.) to the first seat 220 and the body 202. The first bellows 218 is located in the first fluid chamber 206 and prevents the fluid within the first fluid chamber 206 from blending with inert gas in the second fluid chamber 222, and vice versa. The first bellows 218 can compress and/or expand as the piston 204 raises or lowers due to actuation. As long as the first bellows 218 is not stressed past the material yield point, the first bellows 218 returns to its original shape after load(s) and/or pressure differentials are no longer acting on the bellows 218. The example first bellows 218 illustrated in FIG. 2 is a laser-welded metallic bellows, in which individually formed diaphragms are laser-welded together to fabricate the metal bellow. In some examples, the first bellows 218 is manufactured via hydroforming. In some examples, first bellows 218 is fabricated around the piston 204. In some examples, the first bellows 218 is fabricated separately and subsequently assembled onto the piston 204.

In the illustrated example of FIG. 2, the second bellows 224 is attached (e.g., welded, otherwise bonded, etc.) to the second seat 226 and the body 202. The second bellows 224 is located above the second fluid chamber and prevents the pressurized fluid (e.g., inert gas such as nitrogen, helium, argon, etc.) in the second fluid chamber 222 from escaping into the atmosphere and/or outside of the body 202. The example second bellows 224 is the same and/or significantly similar to the geometry, structure, function, and/or design of the example first bellows 218. In some examples, the second bellows 224 is fabricated via laser welding and/or hydroforming processes.

The example split valve 200 illustrated in FIG. 2 includes the spring 228 to counteract the pressure in the first fluid chamber 206 acting on the piston 204 and to dampen oscillating movements that occur when the piston 204 is actuated. In some examples, the spring 228 is attached to the body 202 and/or the third seat 230. The example spring 228 includes materials (e.g., low-alloy manganese, medium-carbon steel, high-carbon steel, etc.) and/or is structurally designed to counteract the force that the fluid pressure applies on the piston 204 and/or the first bellows 218. The example materials and/or structural design of the spring 228 is also chosen based on the pressure in the second fluid chamber 222 counteracting the pressure in the first fluid chamber 206. Some example design factors of the spring 228 that are calibrated to sufficiently counteract the pressure in the first fluid chamber 206 include a wire diameter, a coil diameter, a free length, and a number of active coils. The example spring 228 also dampens movements and vibrations that the piston 204 experiences when the piston 204 is actuated up and/or down. Therefore, when the piston 204 is moved, the piston 204 will stop at its intended position quickly and precisely due to the presence, design, and/or configuration of the spring 228 in the example split valve 200.

In some examples, the split valve 200 illustrated in FIG. 2 may include a linear variable differential transformer (LVDT) to measure the linear displacement of the piston 204. In some examples, the piston 204 may include a ferromagnetic shaft attached to the end of the piston 204 and that acts as the core of the LVDT. In some examples, as the piston 204 moves, the LVDT produces a signal that feeds back to an example control system (e.g., an open-loop control system, a closed-loop, etc. (e.g., a hydraulic control system, a servo control system, an electronic control system, etc.)). The example signal may indicate the actual position of the piston 204, and the example control system may determine an error between the intended position of the piston 204 and the actual position of the piston 204. If the example error is zero or sufficiently close to zero (e.g., 0.1 mm), then the actuating mechanism (e.g., EHSV, electric motor, etc.) stops moving the piston 204. Further details of the LVDT are described below.

Figure 3:
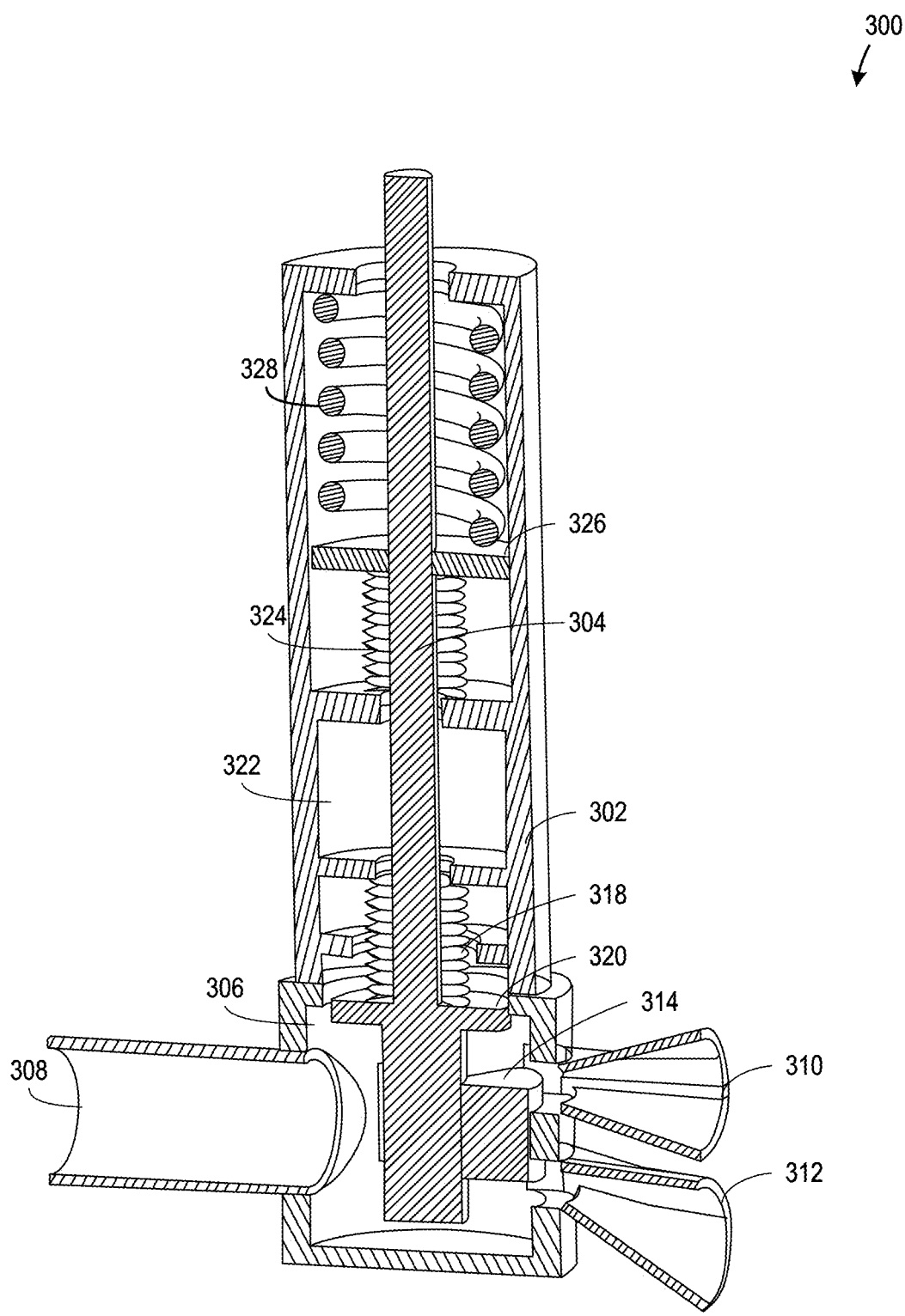
FIG. 3 illustrates a second example split valve with bellows and cascading pressure chambers for regulating fluid flowing through a thermal transport bus.

FIG. 3 illustrates a split valve 300 for regulating the flow of a fluid in a closed loop system. In some examples, the fluid is a supercritical fluid, and the closed loop system is a thermal management system. In some examples, the supercritical fluid is sCO2. The split valve 300 illustrated in FIG. 3 includes a body 302, a piston 304, a first fluid chamber 306, an inlet port 308, a first outlet adapter port 310, a second outlet adapter port 312, a piston head 314, a first bellows 318, a first seat 320, a second fluid chamber 322, a second bellows 324, a second seat 326, and a spring 328. A driving mechanism for the piston 304 in the split valve 300 is not illustrated in FIG. 3. However, in some examples, the mechanism for actuating the piston 304 can be an EHSV, an electric motor, or another mechanism that provides mechanical actuation in response to an electrical signal input.

In some examples, the fluid (e.g., sCO2, etc.) is pressurized to significantly high pressures (e.g., 3000 psi, etc.) in the TMS, the thermal transport bus, and in the first fluid chamber 306. Therefore, in the illustrated example of FIG. 3, the first bellows 318 is attached (e.g., welded, otherwise bonded, etc.) to the body 302 and the first seat 320 to hermetically seal the fluid in the first fluid chamber 306 and inhibit, prevent, and/or otherwise reduce leakage into the second fluid chamber 322 during the lifespan (e.g., usable life) of the split valve 300. In the illustrated example of FIG.

3, the split valve 300 includes the second fluid chamber 322 as a buffer between the first fluid chamber 306 and external, ambient, and/or atmospheric pressures. The example second fluid chamber 322 is pressurized with an inert gas (e.g., nitrogen, helium, argon, etc.) that is non-reactive, non-flammable, and can be pressurized prior to operation of the split valve 300. The inclusion of the second fluid chamber 322 provides a cascading effect in the split valve 300. The cascading effect reduces the pressure differential between the first fluid chamber 306 and the adjacent pressure that the first bellows 318 is sealing. The example second fluid chamber 322 is pressurized to a pressure between the first fluid chamber 306 pressure and ambient and/or atmospheric pressure. For example, the first fluid chamber 306 may be pressurized to 3000 psi, the second fluid chamber may be pressurized to 1500 psi, and ambient and/or atmospheric pressure may be 14.7 psi. The example second fluid chamber 322 mitigates the drop in pressure from the first fluid chamber 306 to atmospheric pressure and significantly reduces stress(es) acting on the first bellows 318. The reduced stress(es) significantly increase the fatigue capability of the example first bellows 318, and the reduced pressure differential significantly increases the cyclic durability of the first bellows 318 and/or the split valve 300. If the example second fluid chamber 322 was not included in the split valve 300, then the first fluid chamber 306 and the first bellows 318 would be adjacent to atmospheric pressure, there would be greater stress(es) acting on the first bellows 318 due to the larger pressure differential, and the split valve 300 and/or the first bellows 318 would have a shorter lifespan. Although the illustrated example of FIG. 3 includes the first fluid chamber 306 and the second fluid chamber 322, the example split valve 300 can include more fluid chambers to provide a more gradual cascading effect to further increase the lifespan (e.g., usable life) of the split valve 300, the first bellows 318, and/or the second bellows 324.

In the illustrated example of FIG. 3, the example split valve 300 includes the first fluid chamber 306 at which the fluid flows into via the inlet port 308 and flows out of via the first outlet adapter port 310 and/or the second outlet adapter port 312. The first outlet adapter port 310 connects the first fluid chamber 306 to a first flowline with a first diameter, and the second outlet adapter port 312 connects the first fluid chamber 306 to a second flowline with a second diameter. The first outlet adapter port 310 and the second outlet adapter port 312 are used to connect the first flowline and the second flowline to the first fluid chamber 306 to reduce the stroke length of the piston 304 relative to what the stroke length would be if the first flowline and the second flowline were directly connected to the first fluid chamber 306 without outlet adapter ports.

In the illustrated example of FIG. 3, the first outlet adapter port 310 has a first entrance and a first exit, and the second outlet adapter port 312 has a second entrance and a second exit. The example first entrance and second entrance are rectangularly shaped with heights that are less than the diameters of the first flowline and the second flowline. The heights of the first entrance and the second entrance are also designed such that if the piston 304 is fully raised and/or the piston head 314 is fully restricting flow through the first outlet adapter port 310, the piston head 314 is also fully allowing flow through the second outlet adapter port 312, and vice versa. The first entrance and second entrance have widths that are greater than the diameters of the first flow line and the second flowline. In some examples, the widths and heights of the of the first entrance and the second entrance are designed such that effective areas of the first entrance and the second entrance are the same as effective areas of the first exit and the second exit as well as effective areas of the first flowline and the second flowline. Therefore, the geometry of the first outlet adapter port 310 and the second outlet adapter port 312 connecting the first fluid chamber 306 to the first flowline and the second flowline reduces the stroke length of the piston 304 (relative to the flowlines being directly connected to the first fluid chamber 306) without restricting flow through the flowlines.

In the illustrated example of FIG. 3, the first bellows 318 is attached (e.g., welded, otherwise bonded, etc.) to the first seat 320 and the body 302. The first bellows 318 is located in the first fluid chamber 306 and prevents the fluid within the first fluid chamber 306 from blending with inert gas in the second fluid chamber 322, and vice versa. The first bellows 318 can compress and/or expand as the piston 304 raises or lowers due to actuation. As long as the first bellows 318 is not stressed past the material yield point, the first bellows 318 returns to its original shape after load(s) and/or pressure differentials are no longer acting on the bellows 318. The example first bellows 318 illustrated in FIG. 3 is a laser-welded metal bellow, in which individually formed diaphragms are laser-welded together to fabricate the metal bellow. In some examples, the first bellows 318 is manufactured via hydroforming. In some examples, first bellows 318 is fabricated around the piston 304. In some examples, the first bellows 318 is fabricated separately and subsequently assembled onto the piston 304.

In the illustrated example of FIG. 3, the second bellows 324 is attached (e.g., welded, otherwise bonded, etc.) to the second seat 326 and the body 302. The second bellows 324 is located above the second fluid chamber and prevents the pressurized fluid (e.g., inert gas such as nitrogen, helium, argon, etc.) in the second fluid chamber 322 from escaping into the atmosphere and/or outside of the body 302. The example second bellows 324 is the same and/or significantly similar to the geometry, structure, function, and/or design of the example first bellows 318. In some examples, the second bellows 324 is fabricated via laser welding and/or hydroforming processes.

The example split valve 300 illustrated in FIG. 3 includes the spring 328 to counteract the pressure in the first fluid chamber 306 acting on the piston 304 and to dampen oscillating movements that occur when the piston 304 is actuated. In some examples, the spring 328 is attached to the body 302 and/or the second seat 326. The example spring 328 is composed of materials (e.g., low-alloy manganese, medium-carbon steel, high-carbon steel, etc.) and/or structurally designed to counteract the force that the fluid pressure applies on the piston 304 and/or the first bellows 318. The example materials and/or structural design of the spring 328 is also chosen based on the pressure in the second fluid chamber 322 counteracting the pressure in the first fluid chamber 306. Some example design factors of the spring 328 that are calibrated to sufficiently counteract the pressure in the first fluid chamber 306 include a wire diameter, a coil diameter, a free length, and a number of active coils. The example spring 328 also dampens movements and vibrations that the piston 304 experiences when the piston 304 is actuated up and/or down. Therefore, when the piston 304 is moved, the piston 304 will stop at its intended position quickly and precisely due to the presence, design, and/or configuration of the spring 328 in the example split valve 300. In the illustrated example of FIG. 3, the spring 328 is located outside of the body 302 as opposed to the illustrated example split valve 200 of FIG. 2 in which the spring 228 is inside of the second fluid chamber 222. Since the example spring 328 is outside of the body 302, an example operator (e.g., a machine, a person, etc.) can efficiently install and/or maintain the spring 328.

In some examples, the split valve 300 illustrated in FIG. 3 may include a linear variable differential transformer (LVDT) to measure the linear displacement of the piston 304. In some examples, the piston 304 may include a ferromagnetic shaft attached to the end of the piston 304 and that acts as the core of the LVDT. In some examples, as the piston 304 moves, the LVDT produces a signal that feeds back to an example control system (e.g., an open-loop control system, a closed-loop, etc. (e.g., a hydraulic control system, a servo control system, an electronic control system, etc.)). The example signal may indicate the actual position of the piston 304 and the example control system may determine an error between the intended position of the piston 304 and the actual position of the piston 304. If the example error is zero or sufficiently close to zero (e.g., 0.1 mm), then the actuating mechanism (e.g., EHSV, electric motor, etc.) stops moving the piston 304. Further details of the LVDT are described below.

Figure 4:
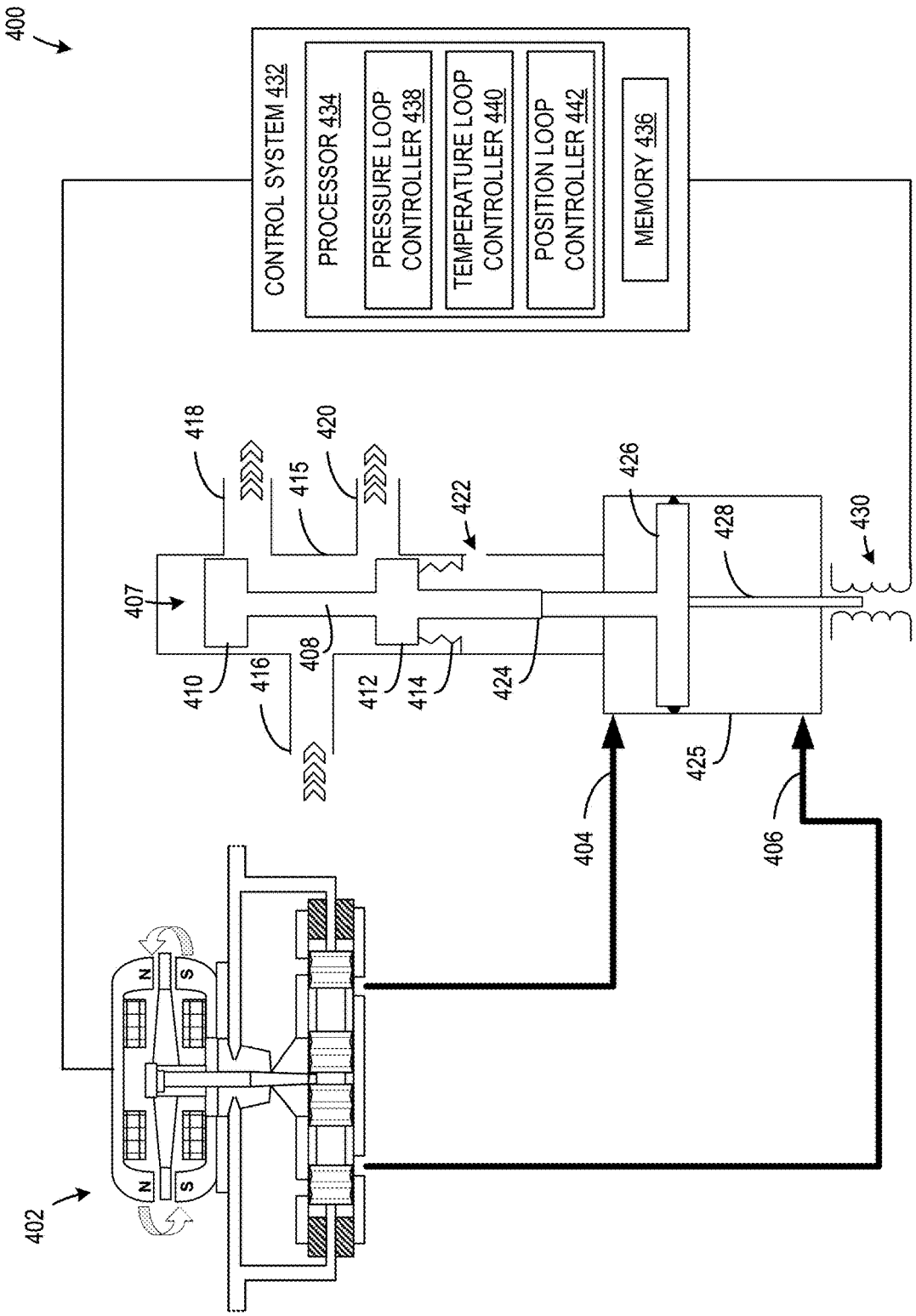
FIG. 4 illustrates a third example split valve with one bellows for regulating fluid flowing through a thermal transport bus.

FIG. 4 illustrates a split valve 400 for regulating the flow of a fluid in a closed loop system. In some examples, the fluid is a supercritical fluid, and the closed loop system is a thermal management system. In some examples, the supercritical fluid is sCO2. The split valve 400 illustrated in FIG. 4 includes an electrohydraulic servo valve (EHSV) 402, a first hydraulic flowline 404, a second hydraulic flowline 406, a piston 407, a piston shaft 408, a first head 410, a second head 412, a bellows 414, a first fluid chamber 415, an inlet flowline 416, a first outlet flowline 418, a second outlet flowline 420, an interstage drain 422, an actuator shaft 424, a second fluid chamber 425, an actuator plate 426, a ferromagnetic shaft 428, an LVDT 430, and a control system 432.

The example split valve 400 illustrated in FIG. 4 includes the EHSV 402 to actuate the piston 407 in the first fluid chamber 415 and regulate the flows of the fluid through the first outlet flowline 418 and the second outlet flowline 420. The example EHSV 402 increases and/or decreases the pressure of the hydraulic fluid in the first hydraulic flowline 404 and/or the second hydraulic flowline 406. The details of how the EHSV 402 increase and/or decrease the pressure outputs in the first hydraulic flowline 404 and the second hydraulic flowline 406 are described above and are known to those with skill in the art.

In the example split valve 400 illustrated in FIG. 4, the first hydraulic flowline 404 and the second hydraulic flowline 406 lead from the EHSV 402 to the second fluid chamber 425. More specifically, the first hydraulic flowline 404 terminates at a first end of the second fluid chamber 425 on a first side of the actuator plate 426, and the second hydraulic flowline 406 terminates at a second end of the second fluid chamber 425 on a second side of the actuator plate 426. The hydraulic pressures that the first hydraulic flowline 404 and the second hydraulic flowline 406 produce in the second fluid chamber 425 act on the actuator plate 426 causing the actuator plate to move up or down. For example, as the pressure output in the first hydraulic flowline 404 increases and the pressure output in the second hydraulic flowline 406 decreases, a distributed force acts on the top of the actuator plate 426 causing the actuator plate to move down. The intensity of pressure outputs the EHSV 402 provides to the second fluid chamber 425 via the first hydraulic flowline 404 and the second hydraulic flowline 406 and the value of pressure differential that is formed across the top and bottom of the actuator plate 426 determine how much and how quickly the actuator plate 426 moves.

In the example illustration FIG. 4, the split valve 400 includes the ferromagnetic shaft 428 that is attached to the bottom of the actuator plate 426 and extends downward in the core of the LVDT 430. As the example actuator plate 426 moves up and down, the ferromagnetic shaft 428 moves the same amount. The example LVDT 430 illustrated in FIG. 4 converts the linear motion of the ferromagnetic shaft 428 into an electrical signal. The example control system 432 (e.g., an open-loop control system, a closed-loop, etc. (e.g., a hydraulic control system, a servo control system, an electronic control system, etc.)) can use the magnitude of the electrical signal to determine the linear distance the ferromagnetic shaft 428 has moved. Other details of the examples, functions, and applications of the example LVDT 430 illustrated in FIG. 4 are known to those with skill in the art.

The example split valve 400 includes the control system 432, processor circuitry 434, and memory 436 (e.g., non-volatile memory, volatile memory, mass storage, etc.) to reposition the piston 407 and, in turn, adjust the flowrates and effective areas of the first outlet flowline 418 and the second outlet flowline 420. In the examples disclosed herein, effective area refers to an opening, a clearance, an adjusted diameter, etc. of a flowline, adapter port, valve, etc. In the illustrated example of FIG. 4, the processor circuitry 434 instantiates (e.g., creates an instance of, brings into being for any length of time, materializes, implements, etc.) a pressure loop controller 438, a temperature loop controller 440, and a position loop controller 442 as a central processing unit executing instructions. In some examples, the control system 432 is a closed-loop system that receives inputs (e.g., a pressure measurement and/or a temperature measurement) from sensor(s) downstream and outputs a commanded position of the piston 407. In the examples disclosed herein, the commanded position of the piston 407 refers to a location of the piston 407 within the first fluid chamber 415 that is different from an initial position of the piston 407. The example commanded position may be a distance relative to the initial position and/or a calibrated position of the piston 407.

The example control system 432 can determine a pressure error between the pressure measurement and a target pressure and/or a temperature error between the temperature measurement and a target temperature. For example, the pressure loop controller 438 may calculate the pressure error (e.g., a difference) between the pressure measurement downstream of the split valve 400 and the target pressure given to the control system 432 via instructions, commands, programs, applications, etc. Based on the pressure error, the example pressure loop controller 438 may determine a target flowrate and/or a target effective area of the first outlet flowline 418 and/or the second outlet flowline 420 that may reduce the pressure error to zero or significantly close to zero (e.g., 0.1% of the target pressure). In some examples, the pressure loop controller 438 determines the commanded position based on the initial position and the pressure error and sends the commanded position to the position loop controller 442 to achieve the target flowrate and/or the target effective area. In some examples, the first outlet flowline 418 leads to a heat exchanger and the second outlet flowline 420 bypasses the heat exchanger. The pressure of the example sCO2 may increase at the heat exchanger based on a transference of heat from an example engine component (e.g., a combustor, compressor, etc.) to the sCO2. The example TMS may have a pressure limit and/or threshold due to structural limitations of the transport bus. The example split valve 400 may increase the flow through the second outlet flowline 420 to increase amount of example sCO2 that bypasses the heat exchanger, reduce the temperature of the sCO2 in the transport bus, and reduce the pressure of the sCO2 in the transport bus. In some examples, the temperature loop controller 440 operates with the same principle as the pressure loop controller 438 but with the temperature measurement and target temperature as the inputs. In some examples, the temperature loop controller 440 is used in the control system 432 in place of or in conjunction with the pressure loop controller 438.

The example position loop controller 442 may adjust an actual position of the piston 407 based on the commanded position. The example control system 432 and/or position loop controller 442 can send signal(s) to the EHSV 402 to move the piston 407 to the commanded position based on a pressure differential between output pressures of the first hydraulic flowline 404 and the second hydraulic flowline 406. During operation of the example split valve 400, the position loop controller 442 may feedback the actual position of the piston 407 to the EHSV 402 based on positional information from the LVDT 430. The example position loop controller 442 may also determine a positional error (e.g., a difference) between the commanded position and the actual position of the piston 407. Additionally or alternatively, the example position loop controller 442 may receive temperature and/or pressure measurement(s) from sensor(s) in the transport bus and feedback information to the EHSV 402 to continue adjusting the position of the piston 407 until the temperature and/or pressure measurement(s) are significantly close to (e.g., within 1% of) the target temperature and/or target pressure. In some examples, the position loop controller 442 is used in place of or in conjunction with the pressure loop controller 438 and/or the temperature loop controller 440.

In the example illustration of FIG. 4, the split valve 400 includes the actuator shaft 424 that connects the actuator plate 426 to the second head 412 of the piston 407. The example actuator shaft 424 illustrated in FIG. 4 transfers motion of the actuator plate 426 to the piston 407. The example actuator shaft 424 can be fixed to the second head 412 and/or the actuator plate 426 via bolts, adhesives, welding, etc. Additionally or alternatively, the example actuator shaft 424 can be manufactured as the same part as the second head 412 and/or the actuator plate 426 via casting, forging, additive manufacturing, etc.

The example actuator shaft 424 illustrated in FIG. 4 fits through an opening in the second fluid chamber 425. In some examples, the opening of the second fluid chamber 425 in which the actuator shaft 424 fits includes a seal (e.g., O-ring, gasket, cartridge seal, axial shaft seal, etc.) that limits leakage of the hydraulic fluid out of the second fluid chamber 425. However, some hydraulic fluid leakage still occurs in the example second fluid chamber 425. Thus, the example split valve 400 includes the interstage drain 422 to allow hydraulic fluid leaked from the second fluid chamber 425 to be collected into an example collection container and/or exit from the split valve 400 body such that the leaked hydraulic fluid does not interfere with the second head 412 and/or the piston 407.

In the illustrated example of FIG. 4, the split valve 400 includes the bellows 414 to hermetically seal the first fluid chamber 415 such that the fluid (e.g., sCO2, etc.) stays pressurized, does not contaminate the hydraulic fluid, and so the hydraulic fluid does not contaminate the fluid. The example bellows 414 is of the same type, design, fabrication, etc. as described above in reference to the bellows 218, 224 of FIG. 2.

In the illustrated example of FIG. 4, the split valve 400 includes the piston shaft 408, the first head 410, and the second head 412 to move up and down based on the desired flowrates in the first outlet flowline 418 and the second outlet flowline 420. The example piston shaft 408, first head 410, and second head 412 are designed to fully cover the second outlet flowline 420 via the second head 412 when the piston 407 is fully raised and to fully cover the first outlet flowline 418 via the first head 410 when the piston 407 is fully lowered. In some examples, the inlet flowline 416 provides flowing sCO2 from the thermal transport bus of the thermal management system to the first fluid chamber 415. In some examples, the first outlet flowline 418 and/or the second outlet flowline 420 provide flowing sCO2 from the first fluid chamber 415 to a first thermal transport bus that leads to an example heat exchanger and/or to a second thermal transport bus that bypass an example heat exchanger.

Figure 5:
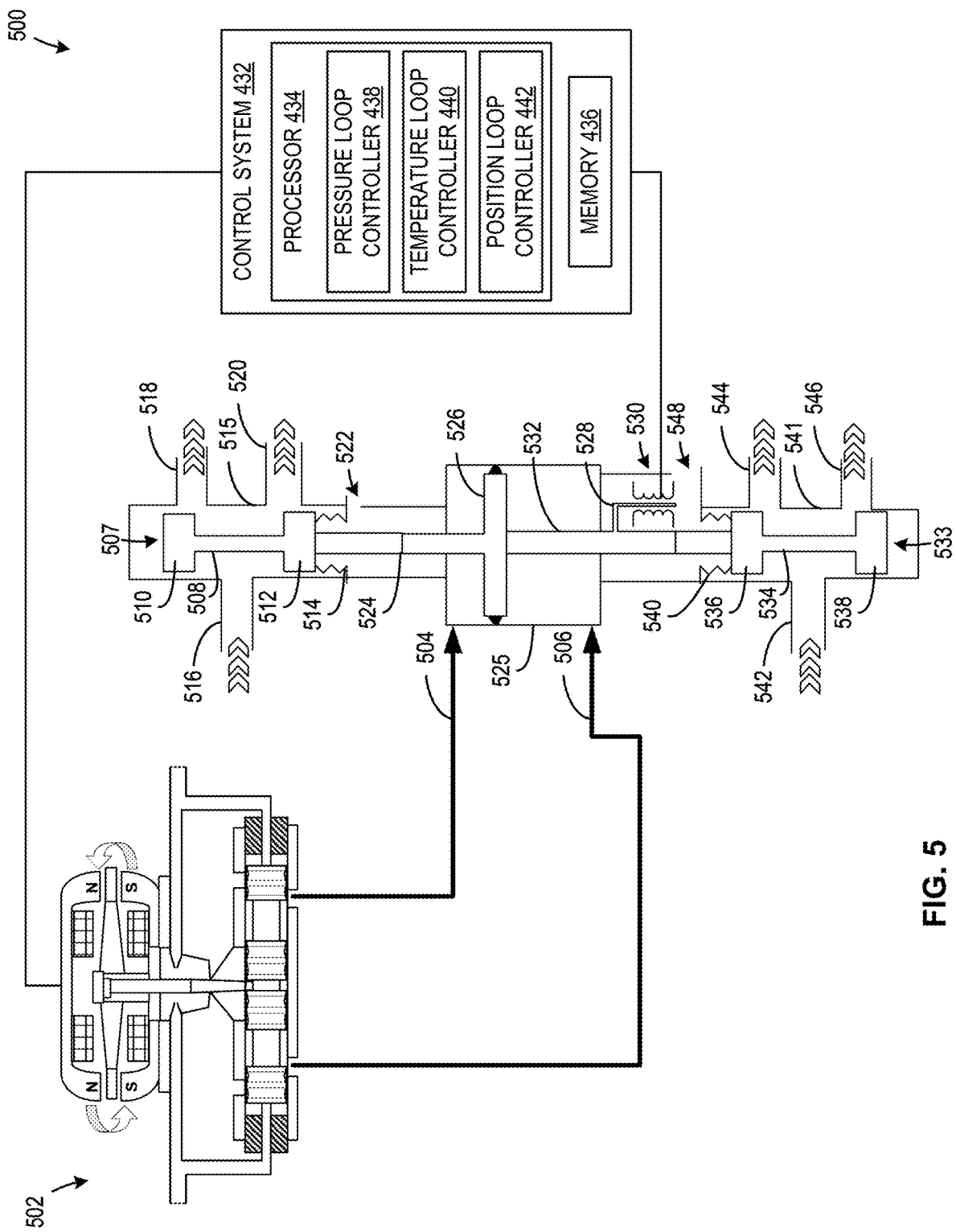
FIG. 5 illustrates a fourth example split valve with two bellows for regulating fluid flowing through a thermal transport bus.

FIG. 5 illustrates a split valve 500 for regulating the flow of a fluid in a closed loop system. In some examples, the fluid is a supercritical fluid, and the closed loop system is a thermal management system. In some examples, the supercritical fluid is sCO2. The split valve 500 illustrated in FIG. 5 includes an electrohydraulic servo valve (EHSV) 502, a first hydraulic flowline 504, a second hydraulic flowline 506, a first piston 507, a first piston shaft 508, a first head 510, a second head 512, a first bellows 514, a first fluid chamber 515, a first inlet flowline 516, a first outlet flowline 518, a second outlet flowline 520, a first interstage drain 522, a first actuator shaft 524, a second fluid chamber 525, an actuator plate 526, a ferromagnetic shaft 528, an LVDT 530, a second actuator shaft 532, a second piston 533, a second piston shaft 534, a third head 536, a fourth head 538, a second bellows 540, a third fluid chamber 541, a second inlet flowline 542, a third outlet flowline 544, a fourth outlet flowline 546, a second interstage drain 548, and a control system 432. The example split valve 500 illustrated in FIG. 5 is similar to the example split valve 400 illustrated in FIG. 4. In the illustrated example of FIG. 4, the split valve 400 includes the EHSV 402 to actuate the piston 407 for regulating fluid flow. In the illustrated example of FIG. 5, the split valve 500 includes the EHSV 502 to actuate two pistons simultaneously for regulating fluid flow in two parallel thermal transport buses.

The example split valve 500 illustrated in FIG. 5 includes the EHSV 502 to actuate the piston in the first fluid chamber 515 and regulate the flows of the fluid through the first outlet flowline 518 and the second outlet flowline 520. The example EHSV 502 increases and/or decreases the pressure of the hydraulic fluid in the first hydraulic flowline 504 and/or the second hydraulic flowline 506. The details of how the EHSV 502 increase and/or decrease the pressure outputs in the first hydraulic flowline 504 and the second hydraulic flowline 506 are described above and are known to those with skill in the art.

In the example split valve 500 illustrated in FIG. 5, the first hydraulic flowline 504 and the second hydraulic flowline 506 lead from the EHSV 502 to the second fluid chamber 525. More specifically, the first hydraulic flowline 504 terminates at a first end of the second fluid chamber 525 on a first side of the actuator plate 526, and the second hydraulic flowline 506 terminates at a second end of the second fluid chamber 525 on a second side of the actuator plate 526. The hydraulic pressures that the first hydraulic flowline 504 and the second hydraulic flowline 506 produce in the second fluid chamber 525 act on the actuator plate 526 causing the actuator plate to move up or down. For example, as the pressure output in the first hydraulic flowline 504 increases and the pressure output in the second hydraulic flowline 506 decreases, a distributed force acts on the top of the actuator plate 526 causing the actuator plate to move down. The intensity of pressure outputs the EHSV 502 provides to the second fluid chamber 525 via the first hydraulic flowline 504 and the second hydraulic flowline 506 and the value of pressure differential that is formed across the top and bottom of the actuator plate 526 determine how much and how quickly the actuator plate 526 moves.

In the example illustration FIG. 5, the split valve 500 includes the ferromagnetic shaft 528 that is attached to the second actuator shaft 532, which is attached to the bottom of the actuator plate 526. The example ferromagnetic shaft 528 extends downward, parallel to the second actuator shaft 532, and into the core of the LVDT 530. As the example actuator plate 526 moves up and down, the ferromagnetic shaft 528 moves the same amount. The example LVDT 530 illustrated in FIG. 5 converts the linear motion of the ferromagnetic shaft 528 into an electrical signal. The example control system 432 (e.g., an open-loop control system, a closed-loop, etc. (e.g., a hydraulic control system, a servo control system, an electronic control system, etc.)) can use the magnitude of the electrical signal to determine the linear distance the ferromagnetic shaft 528 has moved. Other details of the examples, functions, and applications of the example LVDT 530 illustrated in FIG. 5 are known to those with skill in the art.

The example control system 432 illustrated in FIG. 5 is the same as and/or substantially similar to the control system 432 illustrated in FIG. 4. The example control system 432 of FIG. 5 includes the processor 434, the memory 436, the pressure loop controller 438, the temperature loop controller 440, and the position loop controller 442 as described above in reference to FIG. 4. In some examples, the control system 432 of FIG. 5 receives two or more input(s) (e.g., pressure measurement(s) and/or temperature measurement(s)) from sensor(s) downstream of the example split valve 500. In some examples, the control system 432 of FIG. 5 determines the commanded position of the first piston 507 and/or the second piston 533 to reduce the error between the pressure and/or temperature measurement(s) and the target pressure and/or temperature to near zero (e.g., pressure measurement within 1% of target pressure).

In the example illustration of FIG. 5, the split valve 500 includes the first actuator shaft 524 that connects the actuator plate 526 to the second head 512 of the first piston 507 and the second actuator shaft 532 that connects the actuator plate 526 to the third head 536 of the second piston 533. The example first actuator shaft 524 and the example second actuator shaft 532 illustrated in FIG. 5 transfers motion of the actuator plate 526 to the first piston 507 and the second piston 533, respectively. The example first actuator shaft 524 can be fixed to the second head 512 and/or the actuator plate 526 via bolts, adhesives, welding, etc. Additionally or alternatively, the example first actuator shaft 524 can be manufactured as the same part as the second head 512 and/or the actuator plate 526 via casting, forging, additive manufacturing, etc. The example second actuator shaft 532 can be fixed to the third head 536 and/or the actuator plate 526 via bolts, adhesives, welding, etc. Additionally or alternatively, the example second actuator shaft 532 can be manufactured as the same part as the third head 536 and/or the actuator plate 526 via casting, forging, additive manufacturing, etc.

The example first actuator shaft 524 and the example second actuator shaft 532 illustrated in FIG. 5 fit through openings in the second fluid chamber 525. In some examples, the openings of the second fluid chamber 525 in which the first actuator shaft 524 and the second actuator shaft 532 fit include seals (e.g., O-rings, gaskets, cartridge seals, axial shaft seals, etc.) that limit leakage of the hydraulic fluid out of the second fluid chamber 525. However, some hydraulic fluid leakage still occurs in the example second fluid chamber 525. Thus, the example split valve 500 includes the first interstage drain 522 and the second interstage drain 548 to allow hydraulic fluid leaked from the second fluid chamber 525 to be collected into an example collection container and/or exit from the split valve 500 body such that the leaked hydraulic fluid does not interfere with the second head 512, the third head 536, the first piston 507, and/or the second piston 533.

In the illustrated example of FIG. 5, the split valve 500 includes the first bellows 514 and the second bellows 540 to hermetically seal the first fluid chamber 515 and the third fluid chamber 541, respectively, such that the fluid (e.g., sCO2, etc.) stays pressurized, does not contaminate the hydraulic fluid, and so the hydraulic fluid does not contaminate the fluid. The example first bellows 514 and the example second bellows 540 are of the same type, design, fabrication, etc. as described above in reference to the bellows 218, 224 of FIG. 2.

In the illustrated example of FIG. 5, the split valve 500 includes the first piston shaft 508, the first head 510, and the second head 512 to move up and down based on the desired flowrates in the first outlet flowline 518 and the second outlet flowline 520. The example first piston shaft 508, first head 510, and second head 512 are designed to fully cover the second outlet flowline 520 via the second head 512 when the first piston 507 is fully raised and to fully cover the first outlet flowline 518 via the first head 510 when the first piston 507 is fully lowered. In some examples, the first inlet flowline 516 provides flowing sCO2 from the thermal transport bus of the thermal management system to the first fluid chamber 515. In some examples, the first outlet flowline 518 and/or the second outlet flowline 520 provide flowing sCO2 from the first fluid chamber 515 to a first thermal transport bus that leads to an example heat exchanger and/or to a second thermal transport bus that bypasses an example heat exchanger.

In the illustrated example of FIG. 5, the split valve 500 includes the second piston shaft 534, the third head 536, and the fourth head 538 to move up and down based on the desired flowrates in the third outlet flowline 544 and the fourth outlet flowline 546. The example second piston shaft 534, the example third head 536, and the example fourth head 538 are designed to fully cover the fourth outlet flowline 546 via the fourth head 538 when the second piston 533 is fully raised and to fully cover the third outlet flowline 544 via the third head 536 when the piston is fully lowered. In some examples, the second inlet flowline 542 provides flowing sCO2 from the thermal transport bus of the thermal management system to the third fluid chamber 541. In some examples, the third outlet flowline 544 and/or the fourth outlet flowline 546 provide flowing sCO2 from the third fluid chamber 541 to a third thermal transport bus that leads to an example heat exchanger and/or to a fourth thermal transport bus that bypasses an example heat exchanger.

Figure 6:
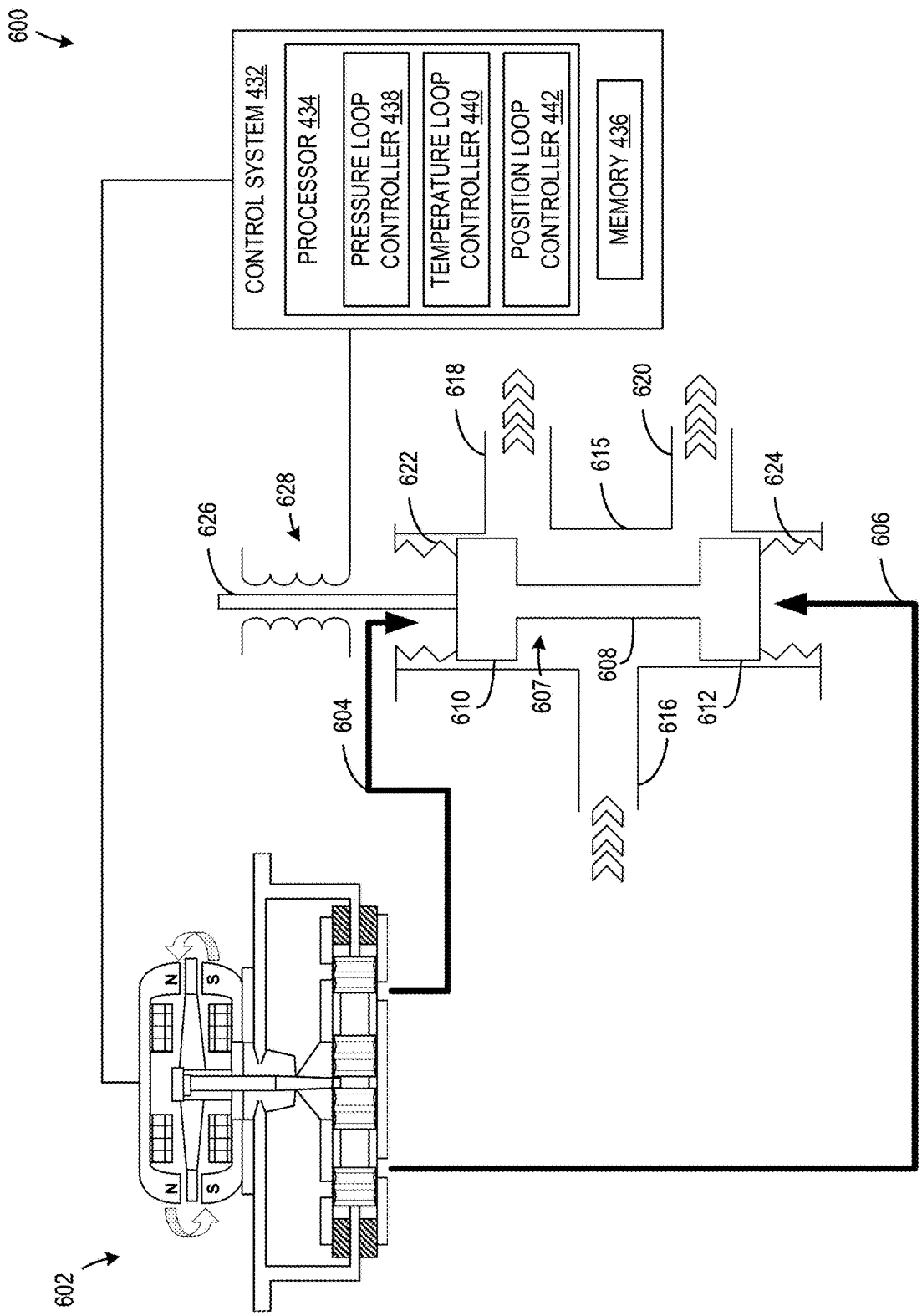
FIG. 6 illustrates a fifth example split valve with two bellows for regulating fluid flowing through a thermal transport bus.

FIG. 6 illustrates a split valve 600 for regulating the flow of a fluid in a closed loop system. In some examples, the fluid is a supercritical fluid, and the closed loop system is a thermal management system. In some examples, the supercritical fluid is sCO2. The split valve 600 illustrated in FIG. 6 includes an EHSV 602, a first hydraulic flowline 604, a second hydraulic flowline 606, a piston 607, a piston shaft 608, a first head 610, a second head 612, a first fluid chamber 615, an inlet flowline 616, a first outlet flowline 618, a second outlet flowline 620, a first bellows 622, a second bellows 624, a ferromagnetic shaft 626, an LVDT 628, and a control system 432. The example split valve 600 illustrated in FIG. 6 is similar to the example split valve 400 illustrated in FIG. 4 and the example split valve 500 illustrated in FIG. 5. The example split valve 600 does not include an actuator plate, rather, the hydraulic pressure from the EHSV 602 acts directly on the first head 610 and the second head 612 of the piston 607. The example split valve 600 also includes the first bellows 622 and the second bellows 624 rather than just one metallic bellow.

The example split valve 600 illustrated in FIG. 6 includes the EHSV 602 to actuate the piston 607 in the first fluid chamber 615 and regulate the flows of the fluid through the first outlet flowline 618 and the second outlet flowline 620. The example EHSV 602 increases and/or decreases the pressure of the hydraulic fluid in the first hydraulic flowline 604 and/or the second hydraulic flowline 606. The details of how the EHSV 602 increase and/or decrease the pressure outputs in the first hydraulic flowline 604 and the second hydraulic flowline 606 are described above and are known to those with skill in the art.

In the example split valve 600 illustrated in FIG. 6, the first hydraulic flowline 604 and the second hydraulic flowline 606 lead from the EHSV 602 to the piston 607. More specifically, the first hydraulic flowline 604 applies a first hydraulic pressure on the first head 610, and the second hydraulic flowline 606 applies a second hydraulic pressure on the second head 612. The magnitude of hydraulic pressures that the first hydraulic flowline 604 and the second hydraulic flowline 606 apply to the first head 610 and the second head 612, respectively, cause the piston 607 to move up or down. More specifically, the difference between the first hydraulic pressure and the second hydraulic pressure determines the direction and distance that the piston 607 moves. For example, as the pressure output in the first hydraulic flowline 404 increases and the pressure output in the second hydraulic flowline 406 decreases, a distributed force acts on the first head 610 causing the piston 607 to move down until the first hydraulic pressure and the second hydraulic pressure equalize. The intensity of the first hydraulic pressure and the second hydraulic pressure that the EHSV 402 provides to the first head 610 and the second head 612, respectively, via the first hydraulic flowline 404 and the second hydraulic flowline 406 and the value of pressure differential that is formed across the top and bottom of the piston 607 determines how much and how quickly the piston 607 moves.

In the example illustration FIG. 6, the split valve 600 includes the ferromagnetic shaft 626 that is attached to the first head 610 and extends upward in the core of the LVDT 628. As the example piston 607 moves up and down, the ferromagnetic shaft 626 moves the same amount. The example LVDT 628 illustrated in FIG. 6 converts the linear motion of the ferromagnetic shaft 626 into an electrical signal. The example control system 432 (e.g., an open-loop control system, a closed-loop, etc. (e.g., a hydraulic control system, a servo control system, an electronic control system, etc.)) can use the magnitude of the electrical signal to determine the linear distance the ferromagnetic shaft 626 has moved. Other details of the examples, functions, and applications of the example LVDT 628 illustrated in FIG. 6 are known to those with skill in the art. Additionally or alternatively, the example ferromagnetic shaft 626 and example LVDT 628 can be located below the piston 607. In some examples, the ferromagnetic shaft 626 can be attached to the second head 612 and can extend downward through the core of the LVDT 628 that is located below the piston 607. The example ferromagnetic shaft 626 illustrated in FIG. 6 can be fixed to the first head 610 (or in some examples, the second head 612) via bolts, adhesives, welding, etc. Additionally or alternatively, the example ferromagnetic shaft 626 can be manufactured as the same part as the first head 610 (or in some examples, the second head 612) via casting, forging, additive manufacturing, etc.

The example control system 432 illustrated in FIG. 6 is the same as and/or substantially similar to the control system 432 illustrated in FIG. 4. The example control system 432 of FIG. 6 includes the processor 434, the memory 436, the pressure loop controller 438, the temperature loop controller 440, and the position loop controller 442 as described above in reference to FIG. 4. In some examples, the control system 432 of FIG. 5 receives two or more input(s) (e.g., pressure measurement(s) and/or temperature measurement(s)) from sensor(s) downstream of the example split valve 600. In some examples, the control system 432 of FIG. 6 determines the commanded position of the piston 607 to reduce the error between the pressure and/or temperature measurement(s) and the target pressure and/or temperature to near zero (e.g., pressure measurement within 1% of target pressure).

In the illustrated example of FIG. 6, the split valve 600 includes the first bellows 622 and the second bellows 624 to hermetically seal the first fluid chamber 615 such that the fluid (e.g., sCO2, etc.) stays pressurized, does not contaminate the hydraulic fluid, and so the hydraulic fluid does not contaminate the fluid. The example first bellows 622 and the example second bellows 624 is of the same type, design, fabrication, etc. as described above in reference to the bellows 218, 224 of FIG. 2.

In the illustrated example of FIG. 6, the split valve 600 includes the piston shaft 608, the first head 610, and the second head 612 to move up and down based on the desired flowrates in the first outlet flowline 618 and the second outlet flowline 620. The example piston shaft 608, first head 610, and second head 612 are designed to fully cover the second outlet flowline 620 via the second head 612 when the piston 607 is fully raised and to fully cover the first outlet flowline 618 via the first head 610 when the piston 607 is fully lowered. In some examples, the inlet flowline 616 provides flowing sCO2 from the thermal transport bus of the thermal management system to the first fluid chamber 615. In some examples, the first outlet flowline 618 and/or the second outlet flowline 620 provide flowing sCO2 from the first fluid chamber 615 to a first thermal transport bus that leads to an example heat exchanger and/or to a second thermal transport bus that bypasses an example heat exchanger.

Figure 7:
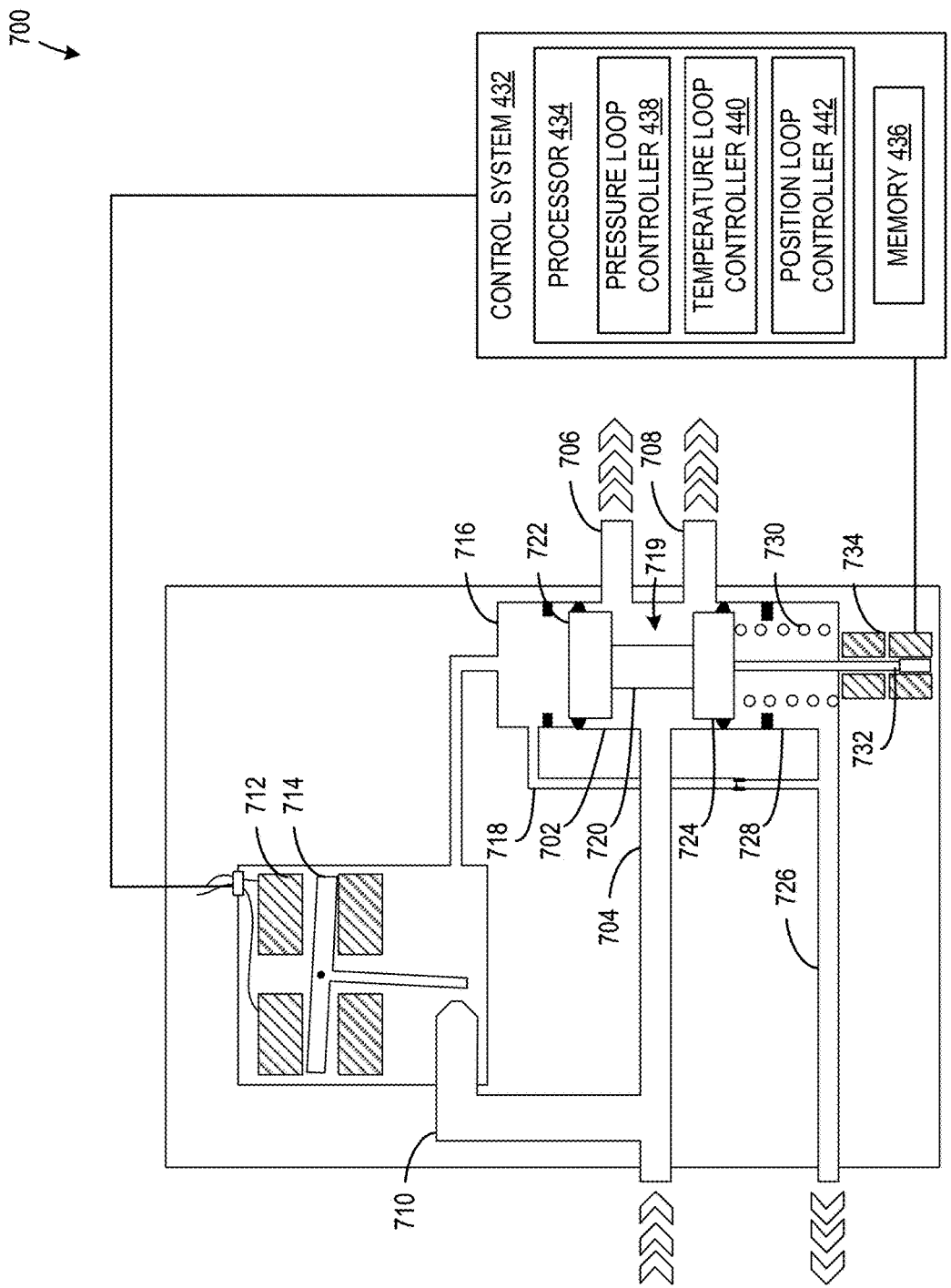
FIG. 7 illustrates a sixth example split valve for regulating fluid flowing through a thermal transport bus and uses the fluid as a hydraulic fluid to actuate the split valve.

FIG. 7 illustrates a split valve 700 for regulating the flow of a fluid in a closed loop system. In some examples, the fluid is a supercritical fluid, and the closed loop system is a thermal management system. In some examples, the supercritical fluid is sCO2. The split valve 700 illustrated in FIG. 7 includes a first fluid chamber 702, an inlet flowline 704, a first outlet flowline 706, a second outlet flowline 708, a hydraulic supply line 710, electromagnets 712, a flapper 714, a second fluid chamber 716, a bleed line 718, a piston 719, a piston shaft 720, a first head 722, a second head 724, a pump inlet flowline 726, a third fluid chamber 728, a spring 730, a ferromagnetic shaft 732, an LVDT 734, and a control system 432. The example split valve 700 illustrated in FIG. 7 is similar to the example split valve 400, the example split valve 500, and/or the example split valve 600 in that a servo valve actuates the piston 719 in the split valve 700. However, the example split valve 700 uses the fluid (e.g., sCO2, etc.) to apply hydraulic pressure to the piston 719 so no contamination can occur between the fluid and a hydraulic fluid (e.g., fuel, oil, water, etc.).

In the illustrated example of FIG. 7, the split valve 700 includes the first fluid chamber 702 and the inlet flowline 704. The inlet flowline 704 contains fluid flowing from a pump that pressurizes the fluid (e.g., sCO2, etc.) in the example thermal transport bus. The example first fluid chamber 702 and the example inlet flowline 704 are pressurized to a first pressure (e.g., 3000 psi) based on the desired pressure for maintaining the supercritical state of the fluid. The example inlet flowline 704 also branches off to the hydraulic supply line 710. The example hydraulic supply line 710 provides pressurized fluid to the servo valve. In the example split valve 700 illustrated in FIG. 7, the fluid acts as the hydraulic fluid that the servo valve uses to actuate the piston 719.

In the illustrated example of FIG. 7, the split valve 700 includes the electromagnets 712 and the flapper 714 to regulate the pressure of the fluid in the second fluid chamber 716, and ultimately, the movement of the piston 719. Similar to the EHSVs described above, the electromagnets 712 are charged with electric current based on a signal sent from the example control system 432 (e.g., an open-loop control system, a closed-loop, etc. (e.g., a hydraulic control system, a servo control system, an electronic control system, etc.)). Also similar to the EHSVs described above, the flapper 714 is made of one or more magnetic metals (e.g., iron, nickel, cobalt, etc.). If the electromagnets 712 are charged with electric current, then the electromagnets 712 produce a magnetic field which generate a torque on the flapper 714. The movement and/or rotation of the example flapper 714, causes an increase or a decrease to a flowrate of the fluid exiting the hydraulic supply line 710. The greater the fluid flowrate is exiting the hydraulic supply line 710, the greater the pressure is in the second fluid chamber 716 and vice versa.

In the illustrated example of FIG. 7, the split valve 700 includes the second fluid chamber 716 that includes the fluid pressurized to a second pressure that can be less than or equal to the first pressure in the first fluid chamber 702 and/or greater than or equal to a third pressure in the third fluid chamber 728. For example, if the second pressure is greater than the third pressure in the example third fluid chamber 728, and if distributed force(s) of the second pressure on the first head 722 is greater than force(s) of the spring 730 on the second head 724, then the piston 719, first head 722, and second head 724 move downward, providing more flow to the second outlet flowline 708 and restrict flow to the first outlet flowline 706. The second pressure in the example second fluid chamber 716 can be adjusted based on the amount of fluid the electromagnets 712 and the flapper 714 allow to flow into the second fluid chamber. The example second fluid chamber 716 includes the bleed line 718 that leads to the pump inlet flowline 726 and the third fluid chamber 728. The example bleed line 718 ensures that pressure in the second fluid chamber 716 does not exceed design or structural limitations that would cause damage to the split valve 700. The example bleed line 718 also supplies fluid to the third fluid chamber 728, which generates a third pressure in the third fluid chamber 728 that is less than the first pressure and the second pressure. The example pump inlet flowline 726 brings the fluid back to the pump that supplied the inlet flowline 704 with the fluid. The example pump inlet flowline 726 ensures that the second fluid chamber 716 and/or the third fluid chamber 728 do not exceed design or structural pressures that may damage the split valve 700.

In the illustrated example of FIG. 7, the split valve 700 includes the spring 730 in the third fluid chamber 728 to counteract the second pressure in the second fluid chamber 716. The example spring 730 generates force(s) on the second head 724 that supplements distributed force(s) of the third pressure in the third fluid chamber 728. Thus, the second pressure in the example second fluid chamber 716 works against the force(s) that the spring 730 generates and the third pressure in the third fluid chamber 728. The example spring 730 and bleed line 718 also dampen oscillations and/or vibrations of the piston 719 when the piston 719 is actuated. The example spring 730 allows the piston 719 to be moved and stopped at precise locations without additional and/or undesired movements that might alter the intended flowrates into the first outlet flowline 706 and/or the second outlet flowline 708.

In the example illustration FIG. 7, the split valve 700 includes the ferromagnetic shaft 732 that is attached to the second head 724 and extends downward into the core of the LVDT 734. As the example piston 719 moves up and down, the ferromagnetic shaft 732 moves the same amount. The example LVDT 734 illustrated in FIG. 7 converts the linear motion of the ferromagnetic shaft 732 into an electrical signal. The example control system 432 (e.g., an open-loop control system, a closed-loop, etc. (e.g., a hydraulic control system, a servo control system, an electronic control system, etc.)) can use the magnitude of the electrical signal to determine the linear distance the ferromagnetic shaft 732 has moved. Other details of the examples, functions, and applications of the example LVDT 734 illustrated in FIG. 7 are known to those with skill in the art. Additionally or alternatively, the example ferromagnetic shaft 732 and example LVDT 734 can be located above the piston 719. In some examples, the ferromagnetic shaft 732 can be attached to the first head 722 and can extend upward through the core of the LVDT 734 that is located above the piston 719. The example ferromagnetic shaft 732 illustrated in FIG. 7 can be fixed to the second head 724 (or in some examples, the first head 722) via bolts, adhesives, welding, etc. Additionally or alternatively, the example ferromagnetic shaft 732 can be manufactured as the same part as the second head 724 (or in some examples, the first head 722) via casting, forging, additive manufacturing, etc.

The example control system 432 illustrated in FIG. 7 is the same as and/or substantially similar to the control system 432 illustrated in FIG. 4. The example control system 432 of FIG. 7 includes the processor 434, the memory 436, the pressure loop controller 438, the temperature loop controller 440, and the position loop controller 442 as described above in reference to FIG. 4. In some examples, the control system 432 of FIG. 7 receives two or more input(s) (e.g., pressure measurement(s) and/or temperature measurement(s)) from sensor(s) downstream of the example split valve 700. In some examples, the control system 432 of FIG. 7 determines the commanded position of the piston 719 to reduce the error between the pressure and/or temperature measurement(s) and the target pressure and/or temperature to near zero (e.g., pressure measurement within 1% of target pressure).

Figure 8:
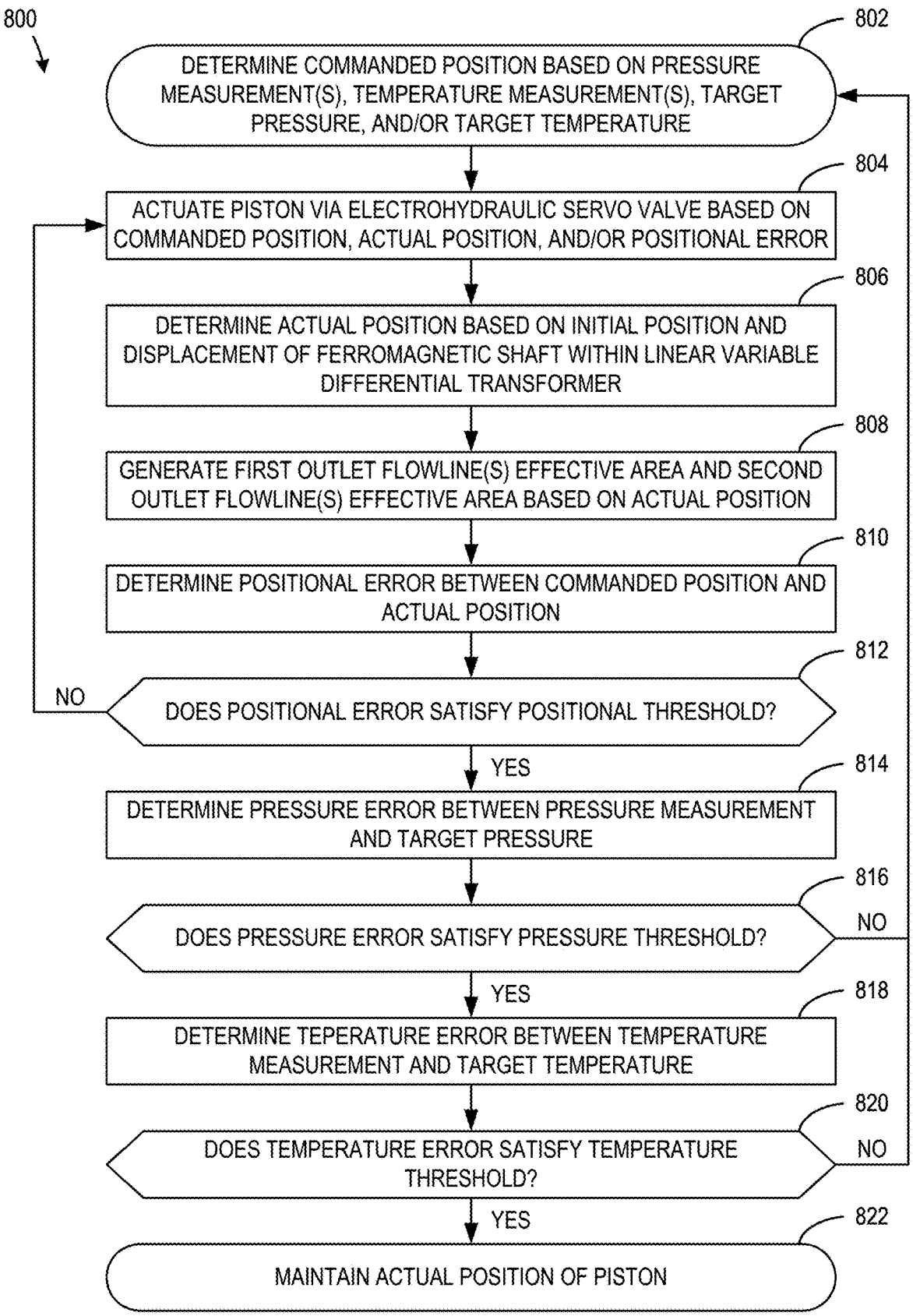
FIG. 8 a flow diagram illustrating example machine readable instructions and/or operations that may be executed and/or instantiated by example processor circuitry to implement a control system that controls the example split valves.

FIG. 8 is a flow diagram illustrating an example process/operation 800 to control operation of the example split valves 400, 500, 600, and/or 700 as disclosed herein. While the example process/operation 800 is described with primary reference to regulating flow of supercritical carbon dioxide (sCO2) with the split valves 400, 500, 600, and/or 700 of FIGS. 4-7, the process/operation 800 can be used to regulate flow of another fluid. While the example process/operation 800 is described with primary reference to control operation of the split valves 400, 500, 600, and/or 700 of FIGS. 4-7, the process/operation 800 can be used to control operation of split valve 200 of FIG. 2, split valve 300 of FIG. 3, or another split valve. While the example process/operation 800 can be described with primary reference to control operations of split valves 400, 500, 600, and/or 700 of FIGS. 4-7, the process/operation 800 is to be described with primary reference to split valve 400 of FIG. 4 for clarity.

At block 802, the control system 432 determines a commanded position of the piston 407 based on pressure measurement(s), temperature measurement(s), target pressure(s), and/or target temperature(s). For example, the pressure loop controller 438 receives the pressure measurement(s) from pressure sensor(s) (e.g., absolute, gauge, differential, etc.) downstream of the split valve 400. The pressure loop controller 438 also receives an initial position (e.g., current position and/or calibrated position) from the position loop controller 442 that indicates the location of the piston 407 in the first fluid chamber 415. The position loop controller 442 can estimate a current flowrate and an effective area of the first outlet flowline 418 and the second outlet flowline 420 based on the initial position. The position loop controller 442 may send the estimated current flowrate and the current effective area to the pressure loop controller 438. The example pressure loop controller 438 can determine target flowrate(s), target effective area(s), and/or the commanded position of the piston 407 based on the current flowrate(s), the effective area(s), the pressure measurement(s), and/or the target pressure. Additionally or alternatively, the temperature loop controller 440 can determine the target flowrate(s), target effective area(s), and/or the commanded position of the piston 407 based on the current flowrate(s), the effective area(s), the temperature measurement(s), and/or the target temperature.

At block 804, the control system 432 actuates the piston 407 via the EHSV 402 based on the commanded position, an actual position of the piston 407, and a positional error. For example, the position loop controller 442 can send a signal to the EHSV 402 to indicate a pressure output increase and/or decrease for the first hydraulic flowline 404 and/or the second hydraulic flowline 406. For example, if the commanded position is to be an inch higher (relative to the orientation and frame of reference of the split valve 400 as illustrated in FIG. 4) than the initial position, then the position loop controller 442 is to cause the EHSV 402 to increase the pressure output of the second hydraulic flowline 406 and decrease the pressure output of the first hydraulic flowline 404.

At block 806, the control system 432 determines the actual position of the piston 407 based on actuation(s) that the EHSV 402 causes. For example, the position loop controller 442 can determine the actual position of the piston 407 based on the initial position and inputs sent from the LVDT 430 that indicate the displacement of the piston 407.

At block 808, the control system 432 generates a first effective area of the first outlet flowline 418 and a second effective area of the second outlet flowline 420. For example, the position loop controller 432 sends signal(s) to the EHSV 402 to actuate the piston 407. Based on the repositioning, the first effective area and the second effective area of the respective outlet flowlines are generated, adjusted, created, modified, etc.

At block 810, the control system 432 determines the positional error between the commanded position and the actual position of the piston 407. For example, the position loop controller 442 calculates a difference between the commanded position and the actual position in response to the actuation of the piston 407 via the EHSV 402. Additionally or alternatively, the position loop controller 442 can continuously compute the positional error while the EHSV 402 actuates the piston 407.

At block 812, the control system 432 determines if the positional error satisfies a positional threshold. For example, the position loop controller 442 can determine if the positional error is less than a predetermined value. The positional threshold may be, for instance, one millimeter. If the positional error is less than or equal to one millimeter, the positional error is said to satisfy the positional threshold. If the position loop controller 442 determines that the positional error does not satisfy the positional threshold, then process/operation 800 proceeds to block 804.

At block 814, if the position loop controller 442 determines that the positional error does satisfy the positional threshold, then the control system 432 determines a pressure error. For example, the pressure loop controller 438 calculates a difference between the pressure measurement and the target pressure. The pressure loop controller 438 may determine the pressure error in response to the position loop controller 442 sending a notification indicating that the positional error satisfies the positional threshold. Additionally or alternatively, the pressure loop controller 438 may determine the pressure error continuously while the position loop controller 442 causes the EHSV 402 to actuate the piston 407.

At block 816, the control system 432 determines if the pressure error satisfies a pressure threshold. For example, the pressure loop controller 438 can determine if the pressure error is less than a predetermined value. The pressure threshold may be, for instance, one pound per square inch. If the pressure error is less than or equal to one pound per square inch, the pressure error is said to satisfy the pressure threshold. If the pressure loop controller 438 determines that the pressure error does not satisfy the pressure threshold, then process/operation 800 proceeds to block 802.

At block 818, if the pressure loop controller 438 determines that the pressure error does satisfy the pressure threshold, then the control system 432 determines a temperature error. For example, the temperature loop controller 440 calculates a difference between the temperature measurement and the target temperature. Additionally or alternatively, the temperature loop controller 440 may determine the temperature error in response to the position loop controller 442 sending a notification indicating that the positional error satisfies the positional threshold. Additionally or alternatively, the temperature loop controller 440 may determine the temperature error continuously while the position loop controller 442 causes the EHSV 402 to actuate the piston 407.

At block 820, the control system 432 determines if the temperature error satisfies a temperature threshold. For example, the temperature loop controller 440 can determine if the temperature error is less than a predetermined value. The temperature threshold may be, for instance, one Kelvin. If the temperature error is less than or equal to one Kelvin, the temperature error is said to satisfy the temperature threshold. If the temperature loop controller 440 determines that the temperature error does not satisfy the temperature threshold, then process/operation 800 proceeds to block 802.

At block 822, if the temperature loop controller 440 determines that the temperature error does satisfy the temperature threshold, then the control system 432 causes the split valve 400 to maintain the actual position of the piston 407. For example the position loop controller 442 ceases transmission of signals to the EHSV 402 and, in turn, causes the piston 407 to stop moving.

Figure 9:
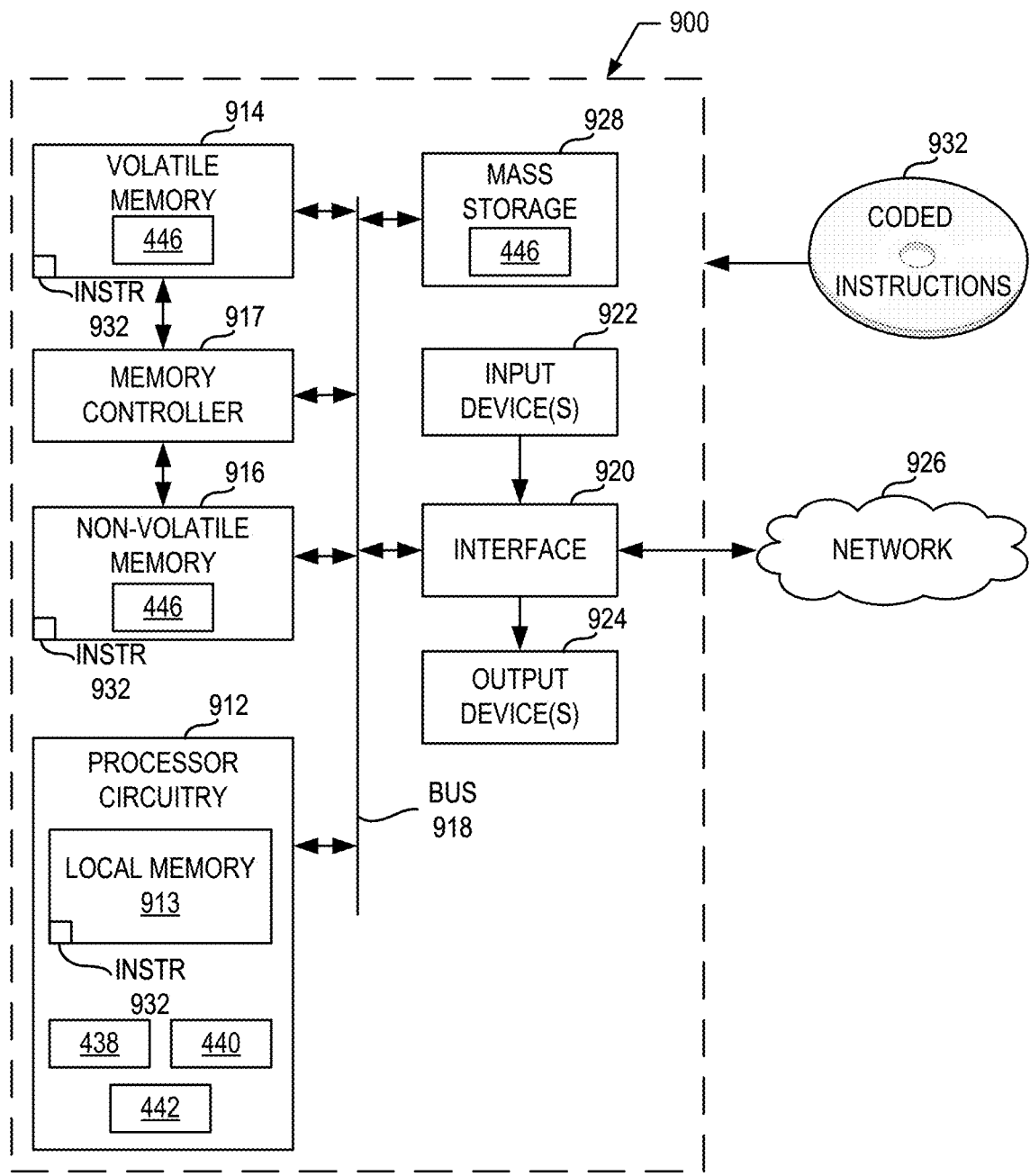
FIG. 9 illustrates an example processing platform including processor circuitry structured to execute the example machine readable instructions of FIG. 8.

FIG. 9 illustrates an example processing platform 900 including processor circuitry 912 structured to execute the example machine readable instructions 800 of FIG. 8. In some examples, the processor circuitry 912 implements the processor 434 of the control system 432 of FIGS. 4-7. As such, the processor circuitry 912 can implement the pressure loop controller 438, the temperature loop controller 440, and/or the position loop controller 442 of FIGS. 4-7. The processing platform 900 of FIG. 9 further includes local memory 913, volatile memory 914, non-volatile memory 916, a memory controller 917, a bus 918, an interface 920, input device(s) 922, output device(s) 924, a network 926, mass storage 928, and instructions 932. In some examples, the volatile memory 914, the non-volatile memory 916, and/or the mass storage 928 implement(s) the memory 436 of the control system 432 of FIGS. 4-7.

In some examples, the split valve(s) 200, 300, 400, 500, 600, 700 include(s) means for controlling a position of the piston (e.g., piston 204, piston 304, piston 407, first piston 507, second piston 533, piston 607, and/or piston 719). For example, the means for controlling may be implemented by the electrohydraulic servo valve (EHSV) 402 of FIG. 4, the EHSV 502 of FIG. 5, the EHSV 602 of FIG. 6, and/or the electromagnets 712 and the flapper 714 of FIG. 7. In some examples, the means for controlling may include a single-stage EHSV or a two-stage EHSV.

In some examples, the split valve(s) 200, 300, 400, 500, 600, 700 include(s) means for regulating the fluid. For example, the means for regulating may be implemented by the piston 204 of FIG. 2, the piston 304 of FIG. 3, the piston 407 of FIG. 4, the first piston 507 and/or the second piston 533 of FIG. 5, the piston 607 of FIG. 6, and/or the piston 719 of FIG. 7. In some examples, the means for regulating may include a piston with one or more piston shafts and piston heads and/or a cylinder to house the piston and accompanying parts.

In some examples, the split valve(s) 200, 300, 400, 500, 600, 700 include(s) means for sealing. For example, the means for sealing may be implemented by the first bellows 218 and/or the second bellows 224 of FIG. 2, the first bellows 318 and/or the second bellows 324 of FIG. 3, the bellows 414 of FIG. 4, the first bellows 514 and/or the second bellows 540 of FIG. 5, the first bellows 622 and/or the second bellows 624 of FIG. 6, and/or the split valve 700 of FIG. 7. In some examples, the means for first sealing may include a metallic bellow, a non-metallic bellow, and/or a body of a split valve.

In some examples, the split valve(s) 200, 300, 400, 500, 600, 700 include(s) means for buffering. For example, the means for buffering may be implemented by the second fluid chamber 222 of FIG. 2 and/or the second fluid chamber 322 of FIG. 3. In some examples, the means for buffering may include a fluid chamber adjacent to one or more other fluid chambers and/or ambient atmosphere. In some examples, the fluid chamber includes an inert gas (e.g., nitrogen, helium, argon, etc.) pressurized to a first pressure, the one or more fluid chambers include the fluid (e.g., a heat exchange fluid such as a supercritical fluid (e.g., sCO2, etc.), etc.) or the inert gas pressurized to a second pressure, and ambient atmosphere includes air at an ambient pressure (e.g., 14.7 psi). The example first pressure is to be less than the second pressure and greater than the ambient pressure.

In some examples, the split valve(s) 200, 300, 400, 500, 600, 700 include(s) means for counteracting. For example, the means for counteracting may be implemented by the spring 228 of FIG. 2, the spring 328 of FIG. 3, and/or the spring 730 of FIG. 7. In some examples, the means for counteracting is to dampen oscillating movement(s) and/or vibrations of a piston (e.g., piston 204, piston 304, piston 407, first piston 507, second piston 533, piston 607, and/or piston 719). In some examples, the means for counteracting may include a spring, a fluid chamber including a pressurized fluid (e.g., a heat exchange fluid (e.g., sCO2), an inert gas, etc.), a metallic bellow, and/or a non-metallic bellow.

In some examples, the split valve(s) 200, 300, 400, 500, 600, 700 include(s) means for collecting. For example, the means for collecting may be implemented by the interstage drain 422 of FIG. 4, the first interstage drain 522 of FIG. 5, and/or the second interstage drain 548 of FIG. 5. In some examples, the means for collecting may include an interstage drain, a bleed line (e.g., bleed line 718 of FIG. 7), an outlet flowline, an inlet flowline, and/or a fluid chamber.

In some examples, the split valve(s) 200, 300, 400, 500, 600, 700 include(s) means for measuring. For example, the means for measuring may be implemented by the linear variable differential transformer (LVDT) 430 of FIG. 4, the LVDT 530 of FIG. 5, and/or the LVDT 734 of FIG. 7. In some examples, the means for measuring may include an LVDT, a ferromagnetic shaft, and/or a control system.

Example split valves for regulating fluid flow in a closed loop system are disclosed herein. The examples disclosed herein control the flowrates of the fluid in two outlet flowlines supplied from an inlet flowline and inhibit blending of the fluid (e.g., sCO2) with a hydraulic fluid (e.g., fuel, oil, etc.) that a servo valve uses to actuate a piston in the example split valves. The examples disclosed herein regulate the fluid flow through the two outlet flowlines without depressurizing the fluid in the closed loop system.

Further aspects of the present disclosure are provided by the subject matter of the following clauses:

Example methods, apparatus, systems, and articles of manufacture to regulate a fluid in closed loop systems are disclosed herein. Further examples and combinations thereof include the following:

Example 1 includes a split valve to regulate a first flowrate and a second flowrate of a fluid within a closed loop system, the split valve comprising an electrohydraulic servo valve coupled to a first piston via a first hydraulic flowline and a second hydraulic flowline, the first piston to include a piston shaft, a first head, and a second head, the first hydraulic flowline to output a first pressure of a hydraulic fluid, the second hydraulic flowline to output a second pressure of the hydraulic fluid, one or more bellows fixed to at least one of the first head or the second head, the one or more bellows to hermetically seal the fluid from the hydraulic fluid, and a control system connected to the electrohydraulic servo valve, the control system to adjust the first flowrate and the second flowrate of the fluid through a first fluid chamber, the first piston to be located in the first fluid chamber.

Example 2 includes the split valve of any preceding clause, wherein the first fluid chamber includes at least an inlet flowline, a first outlet flowline, and a second outlet flowline.

Example 3 includes the split valve of any preceding clause, further including a bellows fixed to the second head of the first piston and to the first fluid chamber, an actuator shaft fixed to an actuator plate and to the second head of the first piston, a second fluid chamber to house the actuator plate and the hydraulic fluid, wherein the actuator plate is driven by a first pressure output from the first hydraulic flowline and a second pressure output from the second hydraulic flowline, an interstage drain between the first fluid chamber and the second fluid chamber, the interstage drain to discharge fluid leaking from at least one of the first fluid chamber or the second fluid chamber, and a ferromagnetic shaft fixed to the actuator plate, the ferromagnetic shaft extending through a linear differential variable transformer to measure a linear displacement of the first piston.

Example 4 includes the split valve of any preceding clause, further including a first bellows fixed to the second head of the first piston and to the first fluid chamber, a first actuator shaft fixed to an actuator plate and to the second head of the first piston, a second fluid chamber to house the actuator plate and the hydraulic fluid, wherein the actuator plate is driven by a first pressure output from the first hydraulic flowline and a second pressure output from the second hydraulic flowline, a second actuator shaft fixed to the actuator plate and to a third head of a second piston, a second bellows fixed to the third head of the second piston and to a third fluid chamber, a first interstage drain between the first fluid chamber and the second fluid chamber, the first interstage drain to discharge fluid leaking from at least one of the first fluid chamber or the second fluid chamber, a second interstage drain between the second fluid chamber and the third fluid chamber, the second interstage drain to discharge fluid leaking from at least one of the second fluid chamber or the third fluid chamber, and a ferromagnetic shaft fixed to at least one of the actuator plate, the first actuator shaft, or the second actuator shaft, the ferromagnetic shaft extending through a linear differential variable transformer to measure a linear displacement of the first piston and the second piston.

Example 5 includes the split valve of any preceding clause, wherein the first piston is driven by a first pressure output from the first hydraulic flowline and a second pressure output from the second hydraulic flowline, further including a first bellows fixed to the first head of the first piston and the first fluid chamber, a second bellows fixed to the second head of the first piston and the first fluid chamber, and a ferromagnetic shaft fixed to at least one of the first head or the second head, the ferromagnetic shaft extending through a linear differential variable transformer to measure a linear displacement of the first piston.

Example 6 includes a split valve to regulate a first flowrate and a second flowrate of a first fluid within a closed loop system, the split valve comprising a piston within a first fluid chamber, the piston to cause the first flowrate and the second flowrate of the first fluid, the first fluid pressurized to a first pressure, the first fluid chamber to include an inlet port, a first outlet adapter port, and a second outlet adapter port, a second fluid chamber adjacent to the first fluid chamber including a second fluid pressurized to a second pressure that is less than the first pressure and greater than an ambient pressure, a first bellows fixed to the piston and to the first fluid chamber, the first bellows to hermetically seal the first fluid chamber from the second fluid chamber, a second bellows fixed to the piston and to the second fluid chamber, the second bellows to hermetically seal the second fluid chamber from ambient air, and a spring fixed to at least a seat or a body of the split valve, the seat fixed to at least the piston or the body, the spring to counteract the first pressure acting on the piston and to dampen movement of the piston.

Example 7 includes the split valve of any preceding clause, wherein the first outlet adapter port includes a first entrance and a first exit, wherein the first entrance is connected to the first fluid chamber, and wherein the first exit is connected to a first flowline with a first diameter.

Example 8 includes the split valve of any preceding clause, wherein the first entrance has a first width that is greater than the first diameter and the first entrance has a first height that is less than the first diameter.

Example 9 includes the split valve of any preceding clause, wherein the second outlet adapter port includes a second entrance and a second exit, wherein the second entrance is connected to the first fluid chamber, and wherein the second exit is connected to a second flowline with a second diameter.

Example 10 includes the split valve of any preceding clause, wherein the second entrance has a second width that is greater than the second diameter and the second entrance has a second height that is less than the second diameter.

Example 11 includes the split valve of any preceding clause, wherein the second fluid is an inert gas.

Example 12 includes the split valve of any preceding clause, further including one or more fluid chambers adjacent to the second fluid chamber that include the second fluid pressurized to a third pressure, the third pressure to be less than the second pressure and greater than the ambient pressure.

Example 13 includes a split valve to regulate a first flowrate and a second flowrate of a fluid within a closed loop system, the split valve comprising a piston located in a first fluid chamber, the piston including a piston shaft, a first head, and a second head, a servo valve coupled to the piston via a second fluid chamber, the second fluid chamber to include a second fluid pressure, the servo valve to include an electromagnetic torque actuator to regulate flow of the fluid into the second fluid chamber, a third fluid chamber connected to the second fluid chamber via a bleed line, wherein the third fluid chamber includes a spring to counteract forces from the second fluid pressure acting on the first head, and a control system connected to the servo valve, the control system to adjust the first flowrate and the second flowrate of the fluid flowing through a first fluid chamber.

Example 14 includes the split valve of any preceding clause, further including a ferromagnetic shaft fixed to the second head, the ferromagnetic shaft extending through a linear differential variable transformer to measure linear displacement of the piston.

Example 15 includes the split valve of any preceding clause, wherein the fluid is supplied to the first fluid chamber and a flapper via a pump.

Example 16 includes the split valve of any preceding clause, wherein the fluid is sent back to the pump via a flowline leading from the third fluid chamber and the bleed line.

Example 17 includes a split valve comprising means for controlling a position of a piston, means for regulating a fluid, the fluid flowing through a first fluid chamber of the split valve, and means for sealing the first fluid chamber from at least one of a second fluid chamber or ambient atmosphere.

Example 18 includes the split valve of any preceding clause, further including means for buffering a first pressure in the first fluid chamber from at least one of a second pressure in the second fluid chamber or a third pressure in the ambient atmosphere.

Example 19 includes the split valve of any preceding clause, further including means for counteracting at least one of a first pressure in the first fluid chamber or a second pressure in the second fluid chamber.

Example 20 includes the split valve of any preceding clause, wherein the means for counteracting is to dampen at least one of a vibration or an oscillation of the piston.

Example 21 includes the split valve of any preceding clause, wherein the fluid is a first fluid, further including means for collecting at least one of the first fluid or a second fluid to be leaked from at least one of the first fluid chamber or the second fluid chamber.

Example 22 includes the split valve of any preceding clause, further including means for measuring a linear displacement of the piston.

Example 23 includes a method to regulate flow of a fluid through a closed loop system, the method comprising controlling a split valve including determining, using a first controller, a commanded position of a piston based on at least a pressure measurement and a target pressure, determining, using the first controller, a first error between the pressure measurement from a pressure sensor and the target pressure, determining, using the first controller, the commanded position based on the first error and an initial position of the piston, determining, using a second controller, an actual position of the piston based on the commanded position, and generating, using the second controller, a first effective area and a second effective area of the split valve.

Example 24 includes the method of any preceding clause, further including determining, using a third controller, the commanded position based on at least a temperature measurement and a target temperature, and determining using the third controller, a second error between the temperature measurement from a temperature sensor and the target temperature.

Example 25 includes the method of any preceding clause, further including actuating the piston based at least the initial position, the commanded position, and the actual position.

Example 26 includes the method of any preceding clause, further including inhibiting, using one or more bellows, the fluid from blending with at least one of a hydraulic fluid or atmosphere.

Example 27 includes the method of any preceding clause, further including dampening at least one of a vibration or an oscillation of the piston.

Example 28 includes the method of any preceding clause, further including counteracting at least one of a first pressure in a first fluid chamber or a second pressure in a second fluid chamber.

Example 29 includes the method of any preceding clause, wherein the fluid is a first fluid, further including buffering one or more bellows against the first pressure of the first fluid in the first fluid chamber via the second pressure of a second fluid in the second fluid chamber.

Example 30 includes the method of any preceding clause, wherein determining the actual position includes measuring a linear displacement of the piston via a linear variable differential transformer.

Example 31 includes the method of any preceding clause, wherein the fluid is a first fluid, further including collecting at least one of the first fluid or a second fluid to be leaked from at least one of a first fluid chamber or a second fluid chamber. The following claims are hereby incorporated into this Detailed Description by this reference, with each claim standing on its own as a separate embodiment of the present disclosure.

What is claimed is:

1. A split valve to regulate a first flowrate and a second flowrate of a first fluid within a closed loop system, the split valve comprising:

a piston within a first fluid chamber, the piston to cause the first flowrate and the second flowrate of the first fluid, the first fluid pressurized to a first pressure, the first fluid chamber including an inlet port, a first outlet adapter port, and a second outlet adapter port;

a second fluid chamber adjacent to the first fluid chamber including a second fluid pressurized to a second pressure that is less than the first pressure and greater than an ambient pressure;

a first bellows fixed to the piston and to the first fluid chamber, the first bellows to hermetically seal the first fluid chamber from the second fluid chamber;

a second bellows fixed to the piston and to the second fluid chamber, the second bellows to hermetically seal the second fluid chamber from ambient air; and a spring fixed to at least a seat or a body of the split valve, the seat fixed to at least the piston or the body, the spring to counteract the first pressure acting on the piston and to dampen movement of the piston.

2. The split valve of claim 1, wherein the first outlet adapter port includes a first entrance and a first exit, wherein the first entrance is connected to the first fluid chamber, and wherein the first exit is connected to a first flowline with a first diameter.

3. The split valve of claim 2, wherein the first entrance has a first width that is greater than the first diameter and the first entrance has a first height that is less than the first diameter.

4. The split valve of claim 1, wherein the second outlet adapter port includes a second entrance and a second exit, wherein the second entrance is connected to the first fluid chamber, and wherein the second exit is connected to a second flowline with a second diameter.

5. The split valve of claim 4, wherein the second entrance has a second width that is greater than the second diameter and the second entrance has a second height that is less than the second diameter.

6. The split valve of claim 1, wherein the second fluid is an inert gas.

7. The split valve of claim 1, further including one or more fluid chambers adjacent to the second fluid chamber that include the second fluid pressurized to a third pressure, the third pressure to be less than the second pressure and greater than the ambient pressure.

8. A method to regulate flow of a fluid through a closed loop system, the method comprising:

controlling a split valve including:

determining, using a first controller, a commanded position of a piston based on at least a pressure measurement and a target pressure;

determining, using the first controller, a first error between the pressure measurement from a pressure sensor and the target pressure;

determining, using the first controller, the commanded position based on the first error and an initial position of the piston;

determining, using a second controller, an actual position of the piston based on the commanded position; and generating, using the second controller, a first effective area and a second effective area of the split valve, the first effective area associated with a first outlet flowline leading to a heat exchanger, the second effective area associated with a second outlet flowline bypassing the heat exchanger.

9. The method of claim 8, further including:
determining, using the first controller, the commanded position based on at least a temperature measurement and a target temperature; and
determining using first controller, a second error between the temperature measurement from a temperature sensor and the target temperature.

10. The method of claim 8, further including actuating the piston based on at least the initial position, the commanded position, and the actual position.

11. The method of claim 8, further including inhibiting, using one or more bellows, the fluid from blending with at least one of a hydraulic fluid or atmosphere.

12. The method of claim 8, further including dampening at least one of a vibration or an oscillation of the piston.

13. The method of claim 8, further including counteracting a first pressure in a first fluid chamber and a second pressure in a second fluid chamber.

14. The method of claim 13, wherein the fluid is a first fluid, further including buffering one or more bellows against the first pressure of the first fluid in the first fluid chamber via the second pressure of a second fluid in the second fluid chamber.

15. The method of claim 8, wherein determining the actual position includes measuring a linear displacement of the piston via a linear variable differential transformer.

* * * * *